(12) United States Patent
Sugawara

(10) Patent No.: US 6,560,232 B1
(45) Date of Patent: May 6, 2003

(54) ATM SWITCH AND SWITCHING METHOD CAPABLE OF AVOIDING COLLISION BETWEEN CELLS

(75) Inventor: Tsugio Sugawara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/437,299

(22) Filed: Nov. 9, 1999

(30) Foreign Application Priority Data

Nov. 12, 1998 (JP) .......................................... 10-321698

(51) Int. Cl.[7] .......................... H04L 12/28; H04L 12/56
(52) U.S. Cl. ...................... 370/395.7; 370/416; 711/100
(58) Field of Search ................................. 370/412, 415, 370/416, 413, 417, 418, 428, 429, 395.41, 395.42, 395.43, 395.4; 710/52, 53, 54, 56, 55, 57

(56) References Cited

U.S. PATENT DOCUMENTS

| | | | | |
|---|---|---|---|---|
| 5,357,506 A | * | 10/1994 | Sugawara | 370/392 |
| 6,256,317 B1 | * | 7/2001 | Holloway et al. | 370/447 |
| 6,427,185 B1 | * | 7/2002 | Ryals et al. | 711/100 |
| 6,442,172 B1 | * | 8/2002 | Wallner et al. | 370/416 |

FOREIGN PATENT DOCUMENTS

| | | |
|---|---|---|
| JP | 5-292116 | 11/1993 |
| JP | 6-105351 | 4/1994 |
| JP | 8-172436 | 7/1996 |
| JP | 9-321768 | 12/1997 |

* cited by examiner

Primary Examiner—Seema S. Rao
Assistant Examiner—Melanie Jagannathan
(74) Attorney, Agent, or Firm—Sughrue Mion, PLLC

(57) ABSTRACT

First to fourth input buffers stores cells inputted from first to fourth input ports, respectively. Each input buffer is equipped with a main buffer section, a plurality of sub-buffer sections connected to the main buffer section in series and a buffer controller for controlling them. A collision judging section judges whether or not a collision occurs between the cells outputted from each sub-buffer section, and the judged result is sent to a cell converter. The cell converter returns a collision information to the buffer controller in accordance with the judged result, and further sends a cell, which has a victory information since it is judged as a victory over the collision, through a sorter to a self-routing section. The self-routing section outputs the received cell to an output port. This configuration enables a shuffle operation to be carried out in the sub-buffer section and the cell converter to thereby avoid the drop of the throughput.

18 Claims, 22 Drawing Sheets

Fig. 9

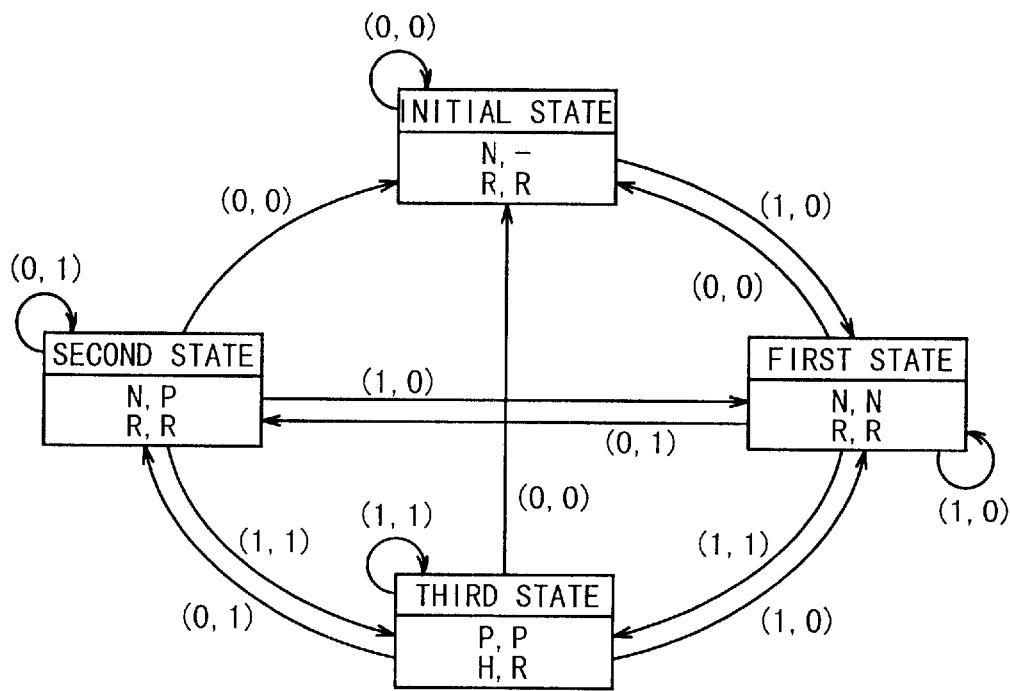

{
(FIRST CONVERSION CIRCUIT, SECOND CONVERSION CIRCUIT)
PRESENCE OR ABSENCE OF COLLISION
BETWEEN RESPECTIVE OUTPUT CELL FROM FIRST AND SECOND
SUB-BUFFER DETECTED BY FIRST AND SECOND CONVERSION CIRCUIT
[0:CASE WITHOUT COLLISION OR CASE OF VICTORY OVER COLLISION]
[1:CASE OF DEFEAT AT COLLISION]

INNER BUFFER TO BE NEXT READ OUT
AT EACH FIRST AND SECOND SUB-BUFFER
[N:N BUFFER, P:P BUFFER -:NO EFFECTIVE CELL]

OPERATION OF WRITING DATA INTO N BUFFER
AT EACH FIRST AND SECOND SUB-BUFFER
[R:WRITE OUTPUT OF EACH BUFFER AT FORMER STAGE]
[H:TRANSIENTLY STOP WRITING DATA]
}

Fig. 10

| STATE AT $G_1, G_2$ | | INNER BUFFER TO WHICH DATA IS NEXT OUTPUT | | NEXT WRITE DATA TO N BUFFER | | REMARK |
|---|---|---|---|---|---|---|
| $G_1$ | $G_2$ | $BF_1$ | $BF_2$ | $BF_1$ | $BF_2$ | |
| 0 | 0 | N | NONE | $BF_0$ OUTPUT | $BF_1$ OUTPUT | $BF_2$ OUTPUTS INEFFECTIVE DATA (EMPTY CELL) |
| 0 | 1 | N | P | $BF_0$ OUTPUT | $BF_1$ OUTPUT | |
| 1 | 0 | N | N | $BF_0$ OUTPUT | $BF_1$ OUTPUT | |
| 1 | 1 | P | P | TRANSIENT STOP | $BF_1$ OUTPUT | TRANSIENTLY STOP READING OUT OPERATION FROM $BF_0$ |

ROUTING INFORMATION A<B

ROUTING INFORMATION A>B

ROUTING INFORMATION A=B
BUFFER IDENTIFIER $BF_k \leqq BF_m$

ROUTING INFORMATION A=B
BUFFER IDENTIFIER $BF_k < BF_m$

ROUTING INFORMATION A=B
BUFFER IDENTIFIER $BF_k \geqq BF_m$

ROUTING INFORMATION A=B
BUFFER IDENTIFIER $BF_k > BF_m$

BANYAN NETWORK

BANYAN NETWORK

OMEGA NETWORK

Fig. 19

| STATE AT G1, G2, G3 | | | INNER BUFFER TO WHICH DATA IS NEXT OUTPUT | | | NEXT WRITE DATA TO N BUFFER | | | | REMARK |
|---|---|---|---|---|---|---|---|---|---|---|
| G1 | G2 | G3 | BF1 | BF2 | BF3 | BF0 | BF1 | BF2 | BF3 | |
| 0 | 0 | 0 | N | NONE | NONE | BF0 OUTPUT | BF1 OUTPUT | BF2 OUTPUT | BF3 OUTPUT | BF2, BF3 OUTPUTS INEFFECTIVE DATA(EMPTY CELL) |
| 0 | 0 | 1 | N | NONE | P | BF0 OUTPUT | BF1 OUTPUT | BF2 OUTPUT | BF2 OUTPUT | BF2 OUTPUTS INEFFECTIVE DATA(EMPTY CELL) |
| 0 | 1 | 0 | N | NONE | N | BF0 OUTPUT | BF1 OUTPUT | BF2 OUTPUT | BF2 OUTPUT | |
| 0 | 1 | 1 | N | P | P | BF0 OUTPUT | BF1 OUTPUT | BF2 OUTPUT | BF2 OUTPUT | |
| 1 | 0 | 0 | N | N | NONE | BF0 OUTPUT | BF1 OUTPUT | BF2 OUTPUT | BF2 OUTPUT | BF2 OUTPUTS INEFFECTIVE DATA(EMPTY CELL) |
| 1 | 0 | 1 | N | N | P | BF0 OUTPUT | BF1 OUTPUT | BF2 OUTPUT | BF2 OUTPUT | |
| 1 | 1 | 0 | N | N | N | BF0 OUTPUT | BF1 OUTPUT | BF2 OUTPUT | BF2 OUTPUT | |
| 1 | 1 | 1 | P | P | P | TRANSIENT STOP | BF1 OUTPUT | BF2 OUTPUT | BF2 OUTPUT | TRANSIENTLY STOP READING OUT OPERATION FROM BF0 |

Fig. 20

| STATE AT $G_1, G_2, G_3, G_4$ | | | | INNER BUFFER TO WHICH DATA IS NEXT OUTPUT | | | | NEXT WRITE DATA TO N BUFFER | | | | REMARK |
|---|---|---|---|---|---|---|---|---|---|---|---|---|
| $G_1$ | $G_2$ | $G_3$ | $G_4$ | $BF_1$ | $BF_2$ | $BF_3$ | $BF_4$ | $BF_1$ | $BF_2$ | $BF_3$ | $BF_4$ | |
| 0 | 0 | 0 | 0 | N | NONE | NONE | NONE | $BF_0$ OUTPUT | $BF_1$ OUTPUT | $BF_2$ OUTPUT | $BF_3$ OUTPUT | $BF_2$, $BF_3$, $BF_4$ OUTPUTS INEFFECTIVE DATA |
| 0 | 0 | 0 | 1 | N | NONE | NONE | P | $BF_0$ OUTPUT | $BF_1$ OUTPUT | $BF_2$ OUTPUT | $BF_3$ OUTPUT | $BF_2$, $BF_3$ OUTPUTS INEFFECTIVE DATA |
| 0 | 0 | 1 | 0 | N | NONE | NONE | N | $BF_0$ OUTPUT | $BF_1$ OUTPUT | $BF_2$ OUTPUT | $BF_3$ OUTPUT | $BF_2$, $BF_3$ OUTPUTS INEFFECTIVE DATA |
| 0 | 0 | 1 | 1 | N | NONE | P | P | $BF_0$ OUTPUT | $BF_1$ OUTPUT | $BF_2$ OUTPUT | $BF_3$ OUTPUT | $BF_2$ OUTPUTS INEFFECTIVE DATA |
| 0 | 1 | 0 | 0 | N | NONE | N | NONE | $BF_0$ OUTPUT | $BF_1$ OUTPUT | $BF_2$ OUTPUT | $BF_3$ OUTPUT | $BF_2$, $BF_4$ OUTPUTS INEFFECTIVE DATA |
| 0 | 1 | 0 | 1 | N | NONE | N | P | $BF_0$ OUTPUT | $BF_1$ OUTPUT | $BF_2$ OUTPUT | $BF_3$ OUTPUT | $BF_2$ OUTPUTS INEFFECTIVE DATA |
| 0 | 1 | 1 | 0 | N | NONE | N | N | $BF_0$ OUTPUT | $BF_1$ OUTPUT | $BF_2$ OUTPUT | $BF_3$ OUTPUT | $BF_2$ OUTPUTS INEFFECTIVE DATA |
| 0 | 1 | 1 | 1 | N | P | P | P | $BF_0$ OUTPUT | $BF_1$ OUTPUT | $BF_2$ OUTPUT | $BF_3$ OUTPUT | |
| 1 | 0 | 0 | 0 | N | N | NONE | NONE | $BF_0$ OUTPUT | $BF_1$ OUTPUT | $BF_2$ OUTPUT | $BF_3$ OUTPUT | $BF_3$, $BF_4$ OUTPUTS INEFFECTIVE DATA |
| 1 | 0 | 0 | 1 | N | N | NONE | P | $BF_0$ OUTPUT | $BF_1$ OUTPUT | $BF_2$ OUTPUT | $BF_3$ OUTPUT | $BF_3$ OUTPUTS INEFFECTIVE DATA |
| 1 | 0 | 1 | 0 | N | N | NONE | N | $BF_0$ OUTPUT | $BF_1$ OUTPUT | $BF_2$ OUTPUT | $BF_3$ OUTPUT | $BF_3$ OUTPUTS INEFFECTIVE DATA |
| 1 | 0 | 1 | 1 | N | N | P | P | $BF_0$ OUTPUT | $BF_1$ OUTPUT | $BF_2$ OUTPUT | $BF_3$ OUTPUT | |
| 1 | 1 | 0 | 0 | N | N | N | NONE | $BF_0$ OUTPUT | $BF_1$ OUTPUT | $BF_2$ OUTPUT | $BF_3$ OUTPUT | $BF_4$ OUTPUTS INEFFECTIVE DATA |
| 1 | 1 | 0 | 1 | N | N | N | P | $BF_0$ OUTPUT | $BF_1$ OUTPUT | $BF_2$ OUTPUT | $BF_3$ OUTPUT | |
| 1 | 1 | 1 | 0 | N | N | N | N | $BF_0$ OUTPUT | $BF_1$ OUTPUT | $BF_2$ OUTPUT | $BF_3$ OUTPUT | |
| 1 | 1 | 1 | 1 | P | P | P | P | TRANSIENT STOP | $BF_1$ OUTPUT | $BF_2$ OUTPUT | $BF_3$ OUTPUT | TRANSIENTLY STOP READING OUT OPERATION FROM $BF_0$ |

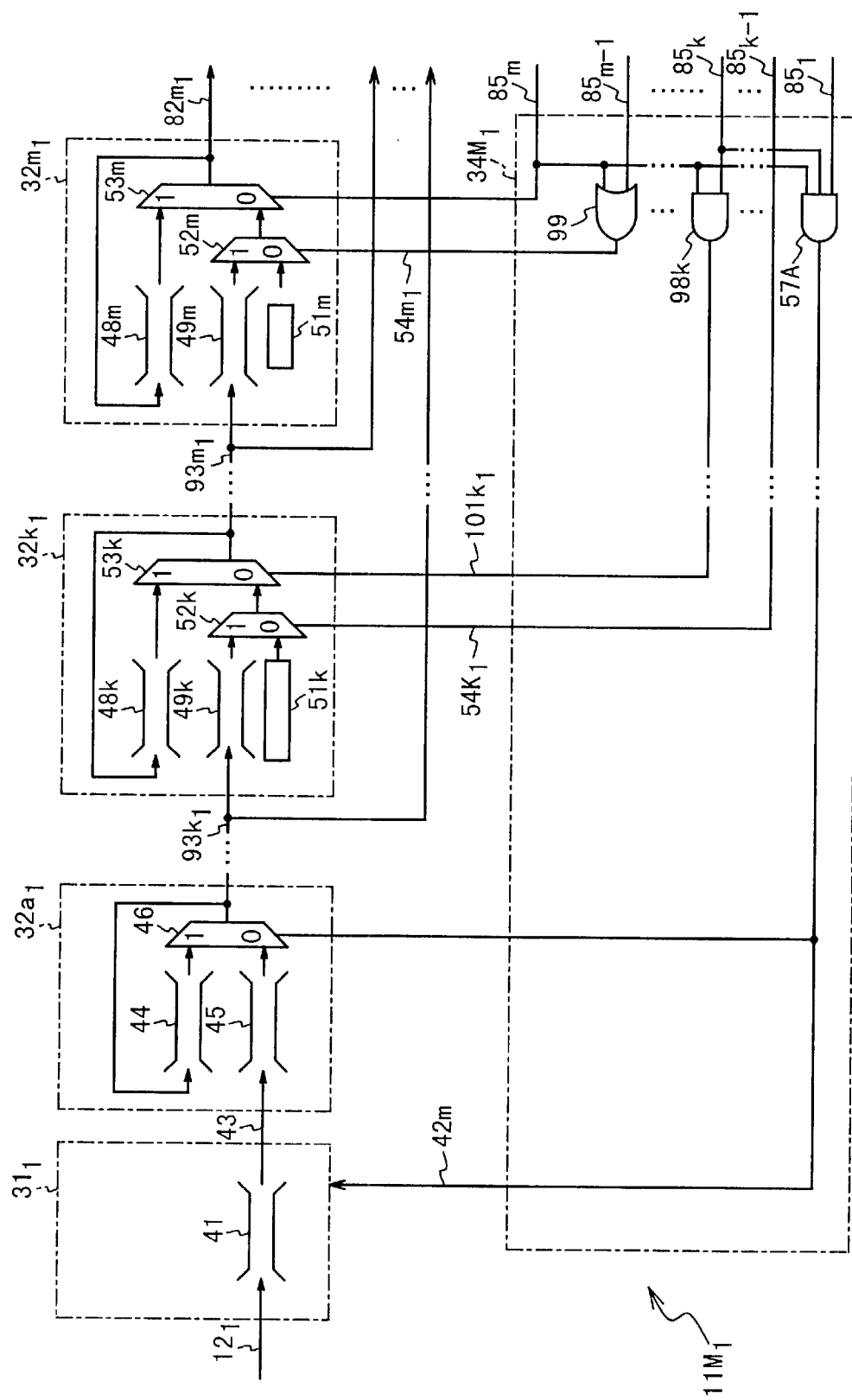

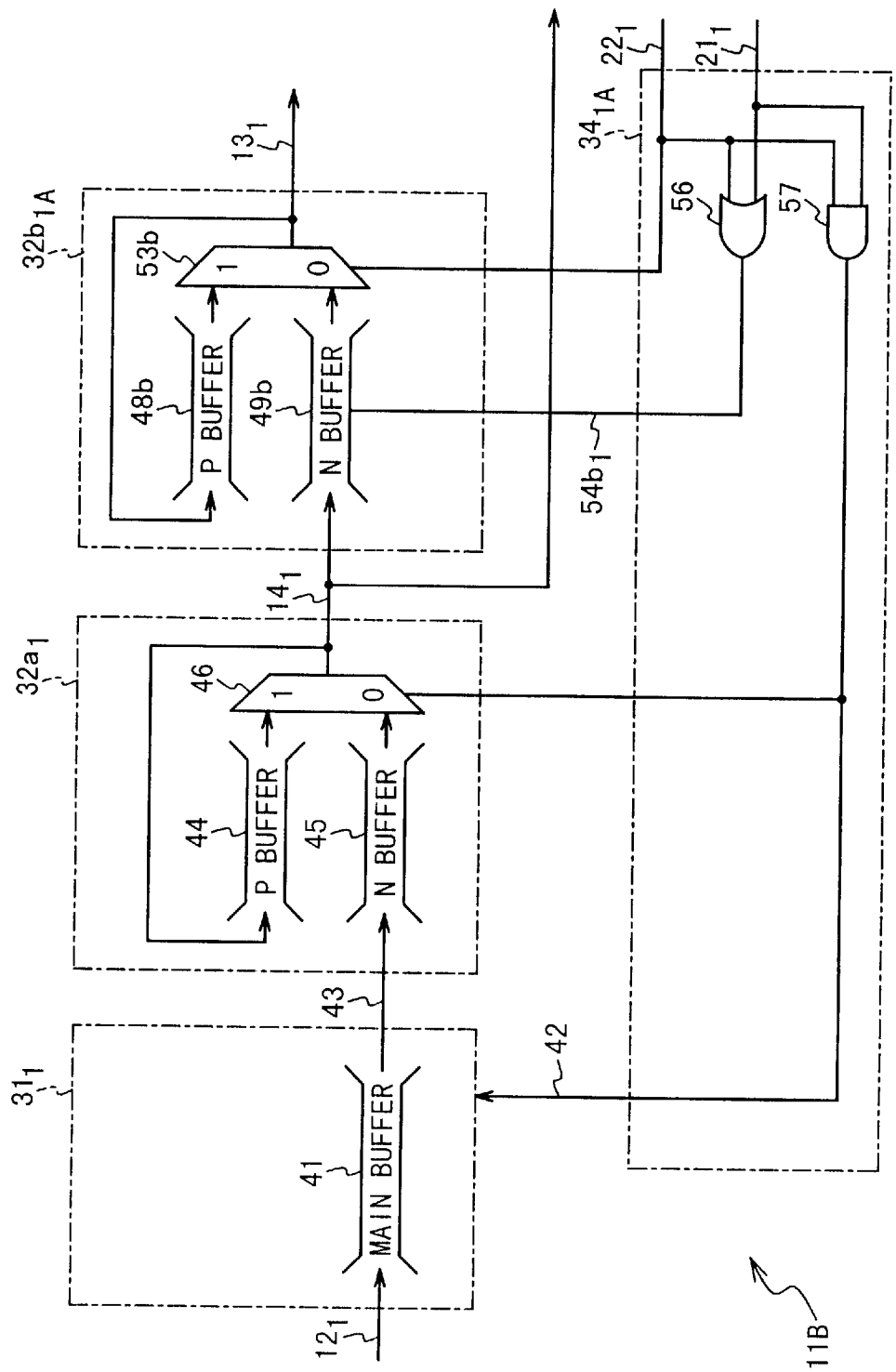

ATM SWITCH AND SWITCHING METHOD CAPABLE OF AVOIDING COLLISION BETWEEN CELLS

BACKGROUND OF THE INVENTION

1. Field of the Invention

The present invention relates to an ATM switch, and more specifically, to an input buffer type ATM switch capable of avoiding a collision between a plurality of cells, which is caused at an output port.

2. Description of the Related Art

An ATM (Asynchronous Transfer Mode) switch determines an output port which is an output destination of an ATM cell (hereafter, merely referred to as a cell) inputted from an input port. That is, the ATM switch stores a cell inputted from the input port in a buffer, and switches the stored cell, and then outputs the switched cell from a predetermined output port. The ATM switch is classified into an input buffer type, a common buffer type, an output buffer type and a cross point buffer type, depending on a buffer configuration method.

FIG. 1 shows an example of a conventional input buffer type ATM switch having four inputs and four outputs. This ATM switch 201 is composed of a first input buffer $202_1$ having a first input port $203_1$, a second input buffer $202_2$ having a second input port port $203_3$, a fourth input buffer $202_4$ having a fourth input port $203_4$, a self-routing section 205 and a collision detector 207.

The first input buffer $202_1$ to the fourth input buffer $202_4$ temporarily store therein the cells inputted from the first input port $203_1$ to the fourth input port $203_4$, respectively. The cells stored in the first to fourth input buffers $202_1$ to $202_4$ are sent to the self-routing section 205.

The self-routing section 205 is provided with a first output port $206_1$, a second output port $206_2$, a third output port $206_3$ and a fourth output port $206_4$. This self-routing section 205 carries out a routing operation to output the cells sent from the first to fourth input buffers $202_1$ to $202_4$ to any of the first to fourth output ports $206_1$ to $206_4$.

The collision detector 207 detects whether or not a cell from a certain input buffer collides with a cell from another input buffers at any of the first to fourth output ports $206_1$ to $206_4$. In detail, the collision detector 207 receives routing information of the cells from the first to fourth input buffers $202_1$ to $202_4$, and then judges whether or not the collision between the cells is caused at least one of the first to fourth output ports $206_1$ to $206_4$. Then, the collision detector 207 sends back the judged result to the first to fourth input buffers $202_1$ to $202_4$.

When each of the first to fourth input buffers $202_1$ to $202_4$ judges that the collision is not caused at any of the first to fourth output ports $206_1$ to $206_4$ by referring to this judged result, it sends the stored cell while maintaining its original state to the self-routing section 205. On the other hand, when each of the first to fourth input buffers $202_1$ to $202_4$ judges that the collision occurs at any of the first to fourth output ports $206_1$ to $206_4$, it determines a victory or a defeat among the collision cells. Then, the victory cell is sent while maintaining its original state to the self-routing section 205 without a delay. The defeat cell is temporally stored in the input buffer. The input buffer in which the defeat cell is stored sends the routing information to the collision detector 207 when the defeat cell is sent out. Then, the input buffer judges whether or not the collision is caused at any of the first to fourth output ports $206_1$ to $206_4$ again.

FIG. 2 shows another example of a conventional input buffer type ATM switch having four inputs and four outputs. This ATM switch 210 is composed of a first input buffer $212_1$ having a first input port $213_1$, a second input buffer $212_2$ having a second input port $213_2$, a third input buffer $212_3$ having a third input port $213_3$, a fourth input buffer $212_4$ having a fourth input port $213_4$, a self-routing section 215 and a collision detector 217.

The first to fourth input buffers $212_1$ to $212_4$ store therein the cells inputted from the first to fourth input ports $213_1$ to $213_4$, respectively. The routing information of the cells stored in the respective first to fourth input buffers $212_1$ to $212_4$ are sent to the collision detector 217 which is located between the self-routing section 215 and these first to fourth input buffers $212_1$ to $212_4$. The self-routing section 215 is provided with a first output port $216_1$, a second output port $216_2$, a third output port $216_3$ and a fourth output port $216_4$.

The collision detector 217 detects whether or not a cell from a certain input buffer collides with a cell from another input buffers at any of the first to fourth output ports $216_1$ to $216_4$ in accordance with routing information of the cells. Then, the cell which is judged not to collide with the other cells at any of the first to fourth output ports $216_1$ to $216_4$ is sent through the collision detector 217 to the self-routing section 215.

The self-routing section 215 distributes the cell to any of the first to fourth output ports $216_1$ to $216_4$, in accordance with the routing information. On the other hand, if such a judgement is made that the collision occurs at any of the first to fourth output ports $216_1$ to $216_4$, the victory and the defeat are determined between the collision cells. Then, the victory cell is sent while maintaining its original state through the collision detector 217 to the self-routing section 215 without a delay. The defeat cell is temporally stored in the input buffer. The input buffer in which the defeat cell is stored sends the routing information to the collision detector 217 when this defeat cell is sent out, and judges whether or not the collision is occurred at any of the first to fourth output ports $216_1$ to $216_4$.

In the ATM switch, when any adjustment is not carried out, such a state may be caused that a plurality of cells inputted from a plurality of input ports is sent to one output port at the same time. To avoid the above state, the ATM switch is provided with the input buffers and the collision detector, as shown in FIGS. 1 and 2, and the collision detector investigates whether or not the collision is caused between the cells in advance. If the occurrence of the collision is detected, one of the plurality of collision cells (the victory cell) is outputted to the output port, and the remaining cells (the defeat cells) are temporally waited in the input buffer. After that, the judgment whether or not the collision is caused is repeatedly performed. The cells, which won in the collisions, are outputted from the output port, one by one.

The occurrence of the collision between the cells may bring about such a situation that when a frame is assembled from the cell, the cell is lost or the cell is arraigned in an erroneous order. In order to avoid such a situation, it is important to determine a buffer capacity in each of the buffer configuration methods. However, a diversification of a communication method in recent years makes an estimate of the buffer capacity required by each of the buffer configuration methods difficult. So, the most of the ATM switches, which are presently sold in a market, are equipped with a large capacity of a buffer at a former stage of an input section, in addition to a buffer having a capacity required by each of the buffer configuration method, in order to cope with an unexpectedly burst traffic. According to this configuration, although a cell loss characteristic can be improved, hardware thereof becomes enormous. Thus, this is contrary to the request of the simplicity of the buffer configuration.

So, a technique is developed which uses an FIFO (First In—First Out) memory and a selection circuit to thereby simplify the buffer configuration simpler and also speed up the entire ATM switches and the input buffer. For example, Japanese Laid Open Patent Application (JP-A-Heisei 5-292116) discloses "CONTROL CIRCUIT FOR INPUT BUFFER TYPE ATM SWITCH". This control circuit is provided with a reading unit to read destinations of a plurality of cells from a top of the FIFO memory and a reservation management table to manage an operation of sending a cell from the FIFO memory. Then, the cell is sent out from the FIFO memory at a reserved cell transfer time.

FIG. 3 is a block diagram showing a schematic configuration of the above-mentioned control circuit. An FIFO memory 221 has taps to read one of a lead cell and a next cell or both of them. An input control circuit 222 and a selector 223 for selecting any one of the two cells are connected to these two taps. A cell outputted from the selector 223 is supplied to a cell transfer memory 224. The cell read out from this cell transfer memory 224 is externally sent out. A cell transfer table 225 and a common controller 226 are connected to the input control circuit 222. In an ATM switch shown in FIG. 3, the two cells can be treated only by a switching operation of the selector 23. Thus, it is possible to substantially halve a transfer time of a cell transfer request signal from the input control circuit 222 to the common controller 226, a transfer time of a response signal from the common controller 226 to the input control circuit 222 and a transfer time of a control signal from the input control circuit 222 to the FIFO memory 221.

Also, Japanese Laid Open Patent Application (JP-A-Heisei 6-105351) discloses "ATM SWITCH". This ATM switch is equipped with a first cell buffer which can read out cells at random and a second cell buffer composed of FIFO memories. When an overcrowding state is reported to the second cell buffer, a cell to be sent to another second cell buffer which is not at the overcrowding state is selected from cells stored in the first cell buffer, and sent to the other second cell buffer. According to this technique, it is possible to avoid a decrease of a throughput resulting from an HOL (Head of Line) effect. Here, the HOL effect implies that when an operation of reading out the cells from the FIFO memories is stopped in order to avoid a collision between the cells, the outputs of the cells on and after that cell are all stopped.

However, this conventional ATM switch has a problem that even if it can avoid the decrease of the throughput resulting from the HOL effect, a judgment whether or not the collision between the cells stored in the input buffer occurs, i.e., a shuffle operation must be carried out in order to avoid the collision, each time a cell transfer timing arrives. That is, in the conventional input buffer type ATM switch, only one cell can be read out from the input buffer at a time, even if an order of sending the cells are changed by the shuffle operation. Thus, when a plurality of stored cells exists in the input buffer, there is a cell, which can not be read out from the input buffer, even if an output port is empty due to the cancellation of a competition relation. As a result, such a problem is remaining that the throughput is dropped than another buffer type ATM switch to thereby prolong the overcrowding state.

Moreover, Japanese Laid Open Patent Application (JP-A-Heisei 9-321768) discloses "ATM SWITCH". A switch portion in this ATM switch includes an input buffer, a crossbar type switch and an arbiter. The input buffer transiently stores therein an ATM cell inputted from a certain input line. The crossbar type switch switches the ATM cell outputted by the input buffer. The arbiter gives an ON/OFF condition of a crossing switch to a crossbar type switch in accordance with a priority given to an FIFO in the input buffer. Moreover, the ATM switch includes a distributor and a selector. The distributor distributes an input cell to an FIFO corresponding to an output line number obtained from a header information of the inputted ATM cell. The selector selects an FIFO to be read out on the basis of a signal given by the arbiter. This configuration enables the avoidance of the occurrence of blocking, and also enables the improvement of a throughput under a high traffic and a decrease of a discarding rate of a cell.

SUMMARY OF THE INVENTION

Therefore, an object of the present invention is to provide an input buffer type ATM switch and switching method of them capable of simplifying a buffer configuration and improving a throughput.

To achieve the above-described object, an ATM switch according to an aspect of the present invention is includes an input port, a main buffer section, a sub-buffer section, a collision judging section, a buffer controller and a routing section.

The input port sequentially receives ATM cells. The main buffer section stores the ATM cells received by the input port and outputs the stored ATM cells in an order of the reception. The sub-buffer section stores the ATM cells from the main buffer section and shuffles the ATM cells stored in the sub-buffer and outputs the shuffled ATM cells.

The collision judging section judges whether or not a collision between the ATM cells outputted from the sub-buffer section occurs and judges whether each of the colliding ATM cells is a victory ATM cell or a defeat ATM cell when the occurrence of the collision is judged. Where, the ATM cells other than the colliding ATM cells are non-collision ATM cells.

The buffer controller which controls the sub-buffer section based on the judging result by the collision judging section such that the victory ATM cell and the non-collision ATM cells are outputted and the defeat ATM cell is stored and held in the sub-buffer section. The routing section which performs a routing operation to each of the victory ATM cell and the non-collision ATM cells from the collision judging section to output from a predetermined output port.

Also, to achieve the above-described object, an ATM switching method according to another aspect of the present invention is composed of the steps of (A) to (G).

In the step (A), the ATM cells sequentially received by an input port is stored into a main buffer section and in the step (B), the ATM cells stored in the main buffer section is outputted in an order of the reception. In the step (C), the ATM cells from the main buffer section is stored into a sub-buffer section, and in the step (D), the ATM cells stored in the sub-buffer is shuffled and the shuffled ATM cells is outputted. In the step (E), it is judged whether or not a collision between the ATM outputted from the sub-buffer section occurs, and also judged whether each of the colliding ATM cells is a victory ATM cell or a defeat ATM cell when the occurrence of the collision is judged. Where, the ATM cells other than the colliding ATM cells are non-collision ATM cells.

In the step (F), the sub-buffer section is controlled based on the judging result at the step (E) such that the victory ATM cell and the non-collision ATM cells are outputted and the defeat ATM cell is stored and held in the sub-buffer section. Also, in the step (G) a routing operation to each of the victory ATM cell and the non-collision ATM cells outputted from the sub-buffer section is performed to send from a predetermined output port.

BRIEF DESCRIPTION OF THE DRAWINGS

A more better understanding of the present invention may be achieved by reading a detailed description in conjunction with the accompanying drawings, in which:

FIG. 9 is a state transition diagram describing an operation of the ATM switch shown in FIG. 4;

FIG. 10 is an explanatory diagram to indicate the state transition diagram shown in FIG. 9 by using a truth table;

FIG. 19 is an explanatory diagram to indicate a state transition of a buffer controller in the fourth variation by using a truth table;

FIG. 20 is an explanatory diagram to indicate a state transition of a buffer controller of an ATM switch according to a fifth variation of the embodiment of the present invention by using a truth table;

FIG. 21 is an explanatory diagram showing a configuration of an input buffer when a depth of shuffle is generalized as "m"; and FIG. 22 is a block diagram showing a configuration of a first input buffer of an ATM switch according to a sixth variation of the embodiment of the present invention.

DESCRIPTION OF THE PREFERRED EMBODIMENTS

Figure 1:
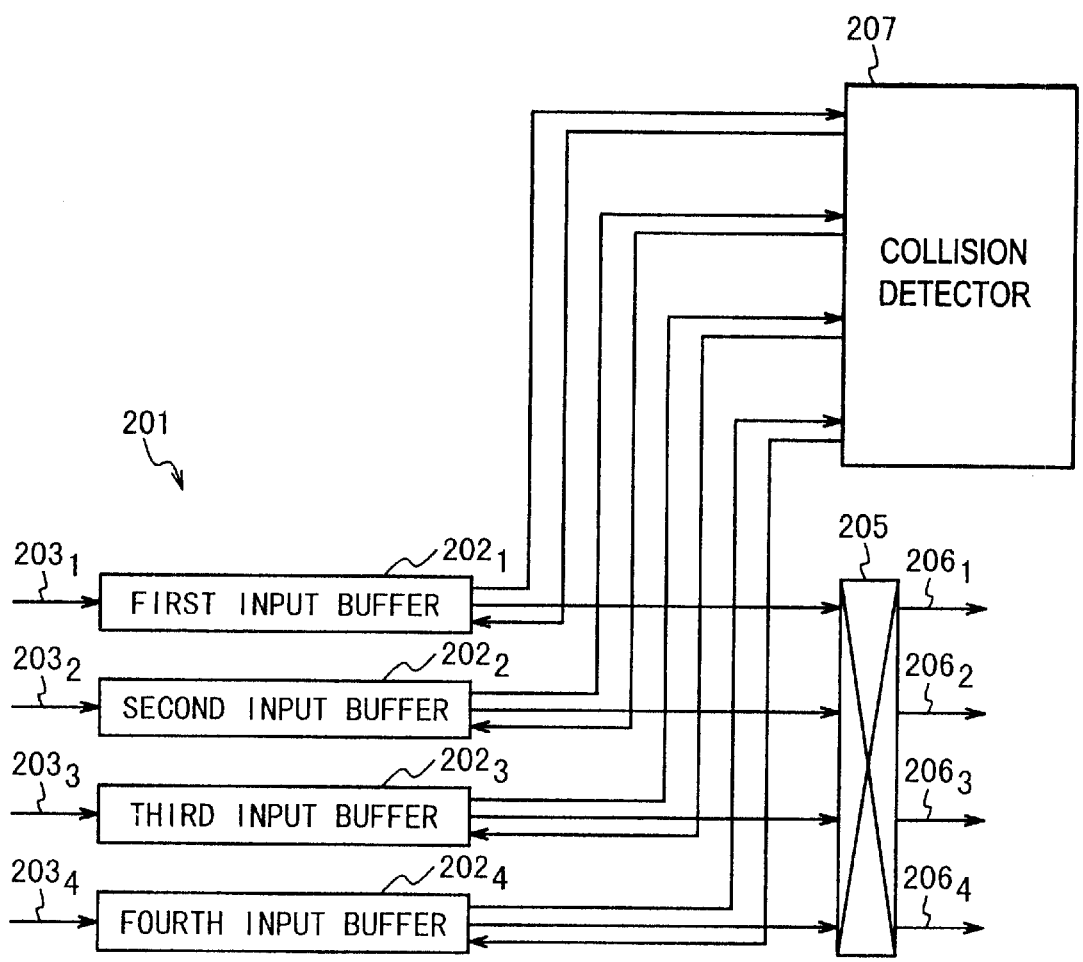
FIG. 1 is a block diagram showing an example of a configuration of a conventional input buffer type ATM switch.
Figure 2:
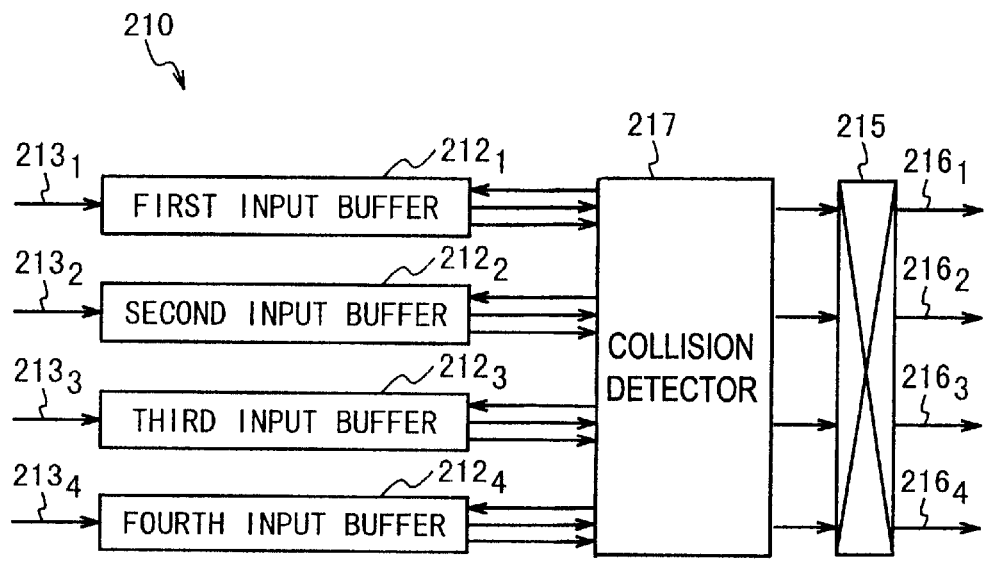
FIG. 2 is a block diagram showing another example of the configuration of the conventional input buffer type ATM switch.
Figure 3:
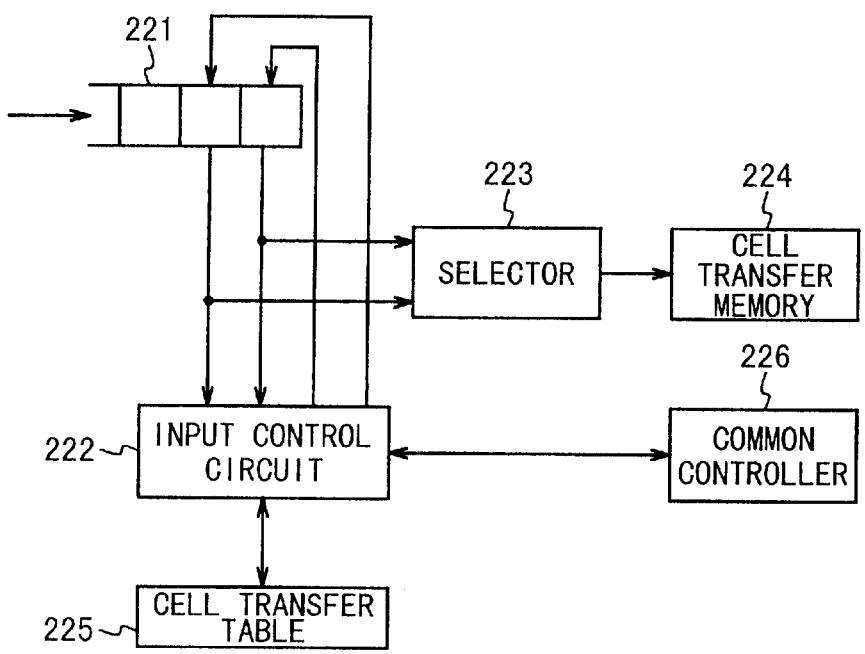
FIG. 3 is a block diagram showing a main portion of a conventional ATM switch employing FIFO memories.

An ATM switch according to an embodiment of the present invention will be described in detail below with reference to the attached drawings.

At first, a schematic configuration of an ATM switch according to an embodiment of the present invention is described with reference to FIG. 4. This ATM switch has four inputs and four outputs (4×4). A depth of shuffle is "2". This ATM switch is composed of a first input buffer $11_1$ having a first input port $12_1$, a second input buffer $11_2$ having a second input port $12_2$, a third input buffer $11_3$ having a third input port $12_3$, a fourth input buffer $11_4$ having a fourth input port $12_4$, a collision judging section 15, a first cell converter $19_1$, a second cell converter $19_2$, a third cell converter $19_3$, a fourth cell converter $19_4$, a sorter 25 and a self-routing section 28. The self-routing section 28 includes a first output port $29_1$, a second output port $29_2$, a third output port $29_3$ and a fourth output port $29_4$.

The first input buffer $11_1$ temporally stores therein a cell inputted from the first input port $12_1$, and sends stored cells $13_1$, $14_1$ to the collision judging section 15. Also, this first input buffer $11_1$ receives collision information $21_1$, $22_1$ (will be discussed more in detail later) from the first cell converter $19_1$. This first input buffer $11_1$ is composed of a main buffer section $31_1$, a first sub-buffer section $32a_1$, a second sub-buffer section $32b_1$ and a buffer controller $34_1$.

The main buffer section $31_1$ temporally stores therein the cell inputted from the first input port $12_1$. A cell outputted from the main buffer section $31_1$ is sent to the first sub-buffer section $32a_1$. The first sub-buffer section $32a_1$ temporally stores therein the cell from the main buffer section $31_1$. A cell $14_1$ outputted from the first sub-buffer section $32a_1$ is sent to the second sub-buffer section $32b_1$ and the collision judging section 15. The second sub-buffer section $32b_1$ temporally stores therein the cell outputted from the first sub-buffer section $32a_1$. A cell $13_1$ outputted from the second sub-buffer section $32b_1$ is sent to the collision judging section 15. Also, the buffer controller $34_1$ controls the operations of the main buffer section $31_1$, the first sub-buffer section $32a_1$ and the second sub-buffer section $32b_1$, in accordance with the collision information $21_1$, $22_1$ sent from the first cell converter $19_1$.

The configuration of each of the second to fourth input buffers $11_2$ to $11_4$ is similar to that of the first input buffer $11_1$.

The collision judging section 15 detects a presence or absence of a collision between a plurality of cells. If detecting the collision, it judges that one among the plurality of cells gets a victory, and judges that the remaining cells are defeated. This judged result is written to respective switching information sections of cells $16_1$, $17_1$, cells $16_2$, $17_2$, cells $16_3$, $17_3$, and cells $16_4$, $17_4$, as the collision information (refer to FIG. 8). Then, the collision judging section 15 sends the cells $16_1$, $17_1$, cells $16_2$, $17_2$, cells $16_3$, $17_3$, and cells $16_4$, $17_4$ to which the collision information are written, to the first to fourth cell converters $19_1$ to $19_4$, respectively.

The first cell converter $19_1$ is composed of a first conversion circuit $36_1$ and a second conversion circuit $36_2$. The first conversion circuit $36_1$ sends the collision information $21_1$ included in the cell $16_1$ outputted from the collision judging section 15 to the buffer controller $34_1$ in the first input buffer $11_1$. Also, the first cell converter $19_1$ sends a cell $23_1$ including a victory information indicative of the victory over the collision, while maintaining its original state, to the sorter 25. Also, the first conversion circuit $36_1$ converts the cell judged to be defeated into an empty cell, and then sends it to the sorter 25. The second conversion circuit $36_2$ sends the collision information $22_1$ included in the cell $17_1$ outputted from the collision judging section 15 to the buffer controller $34_1$ in the first input buffer $11_1$. Also, the second conversion circuit $36_2$ sends a cell $24_1$ including a victory information, while maintaining its original state, to the sorter 25. Also, the second conversion circuit $36_2$ converts the cell judged to be defeated into an empty cell, and then sends it to the sorter 25.

The configuration of each of the second to fourth cell converters $19_2$ to $19_4$ is similar to that of the first cell converter $19_1$. The operations of the first to fourth cell converters $19_1$ to $19_4$ will be described later in detail.

The sorter 25 sorts cells $23_1$ to $23_4$ and cells $24_1$ to $24_4$ which are sent from the first to fourth cell converters $19_1$ to $19_4$. Cells $27_1$ to $27_4$ sorted by this sorter 25 are sent to the self-routing section 28. The cells $23_1$ to $23_4$ and the cells $24_1$ to $24_4$ which are supplied to the sorter 25 include the cells getting the victory over the collisions and the empty cells obtained by converting the cells defeated at the collisions. Thus, the maximum number of effective cells which are not the empty cells is equal to the number "4" of output ports.

The self-routing section 28 is composed of an existing non-blocking network such as a Banyan network or an Omega network, or an existing non-blocking switch such as a crossbar type switch. In the ATM switch according to this embodiment, it is insured that each of cells inputted to the self-routing section 28 does not collide at the output port. Thus, the self-routing section 28 can be dedicated to a routing operation without considering the occurrence of the collision.

Now, the concrete configuration of the ATM switch will be described below. FIG. 5 is a block diagram showing the concrete configuration of the first input buffer $11_1$ shown in FIG. 4. The main buffer section $31_1$ accommodates a main buffer 41. The main buffer 41 is composed by FIFO memory having a large capacity and has a function equivalent to that of the input buffer in the conventional input buffer type ATM switch. In such a condition that a stop signal 42 to temporally stop a reading out operation of a main buffer is not sent from the buffer controller $34_1$ to the main buffer section $31_1$, cells 43 are read out from the main buffer 41, one by one, in accordance with a cell transfer timing, and sent to the first sub-buffer section $32a_1$. Also, the main buffer 41 stores therein the cells inputted from the first input port $12_1$ in an arrival order.

The first sub-buffer section $32a_1$ is composed of a P buffer 44, an N buffer 45 and a selection circuit 46. Each of the P buffer 44 and the N buffer 45 has a memory capacity corresponding to one cell. The N buffer 45 stores therein the cell 43 from the main buffer section $31_1$. The cell stored in this N buffer 45 is sent to an input terminal "0" of the selection circuit 46. The P buffer 44 stores and holds therein a cell from the selection circuit 46. The cell stored in this P buffer 44 is sent to an input terminal "1" of the selection circuit 46. The selection circuit 46 selects the cell stored in any of the P buffer 44 and the N buffer 45, in accordance with the stop signal 42 to temporally stop a reading out operation of a main buffer, and outputs the selected cell as the cell $14_1$. The cell $14_1$ outputted from this selection circuit 46 is sent to the P buffer 44, the second sub-buffer section $32b_1$ and the collision judging section 15 (refer to FIG. 4).

The second sub-buffer section $32b_1$ is composed of a P buffer 48b, an N buffer 49b, an empty cell generation circuit 51b, a first selection circuit 52b and a second selection circuit 53b. Each of the P buffer 48b and the N buffer 49b has a memory capacity corresponding to one cell. The N buffer 48b stores therein the cell $14_1$ outputted from the first sub-buffer section $31a_1$. The cell stored in this N buffer 48b is sent to an input terminal "1" of the first selection circuit 52b. The empty cell generation circuit 51b generates an empty cell, and sends to an input terminal "0" of the first selection circuit 52b. The first selection circuit 52b selects the cell stored in the N buffer 49b or the empty cell from the empty cell generation circuit 51b, in accordance with a selection control signal $54b_1$ sent from the buffer controller $34_1$ at the cell transfer timing, and outputs the selected cell. The cell outputted from this first selection circuit 52b is sent to an input terminal "0" of the second selection circuit 53b.

The P buffer 48b stores and holds therein the cell from the second selection circuit 53b. The cell stored in this P buffer 48b is sent to an input terminal "1" of the second selection circuit 53b. The second selection circuit 53b selects the cell stored in the P buffer 48b or the cell from the first selection circuit 52b, in accordance with the collision information $22_1$ sent from the second conversion circuit $36_2$ of the first cell converter $19_1$, and outputs the selected cell as the cell $13_1$. The cell $13_1$ outputted from this second selection circuit 53b is sent to the P buffer 48b and the collision judging section 15 (refer to FIG. 4).

The buffer controller $34_1$ is composed of an OR circuit 56 to generate a selection control signal $54b_1$ and an AND circuit 57 to generate the stop signal 42 for temporally stopping a reading out operation of a main buffer. The collision information $21_1$ outputted from the first cell converter $19_1$ is sent to the second selection circuit 53b while maintaining its original state, and also supplied to one input terminal of each of the OR circuit 56 and the AND circuit 57. The collision information $22_1$ outputted from the first cell converter $19_1$ is sent to another input terminal of each of the OR circuit 56 and the AND circuit 57.

This buffer controller $34_1$ controls the reading out operation from the main buffer section $31_1$ the first sub-buffer section $32a_1$ and the second sub-buffer section $32b_1$ in accordance with the collision information $21_1$, $22_1$. This control operation of the buffer controller $34_1$ will be described later in detail.

Figure 4:
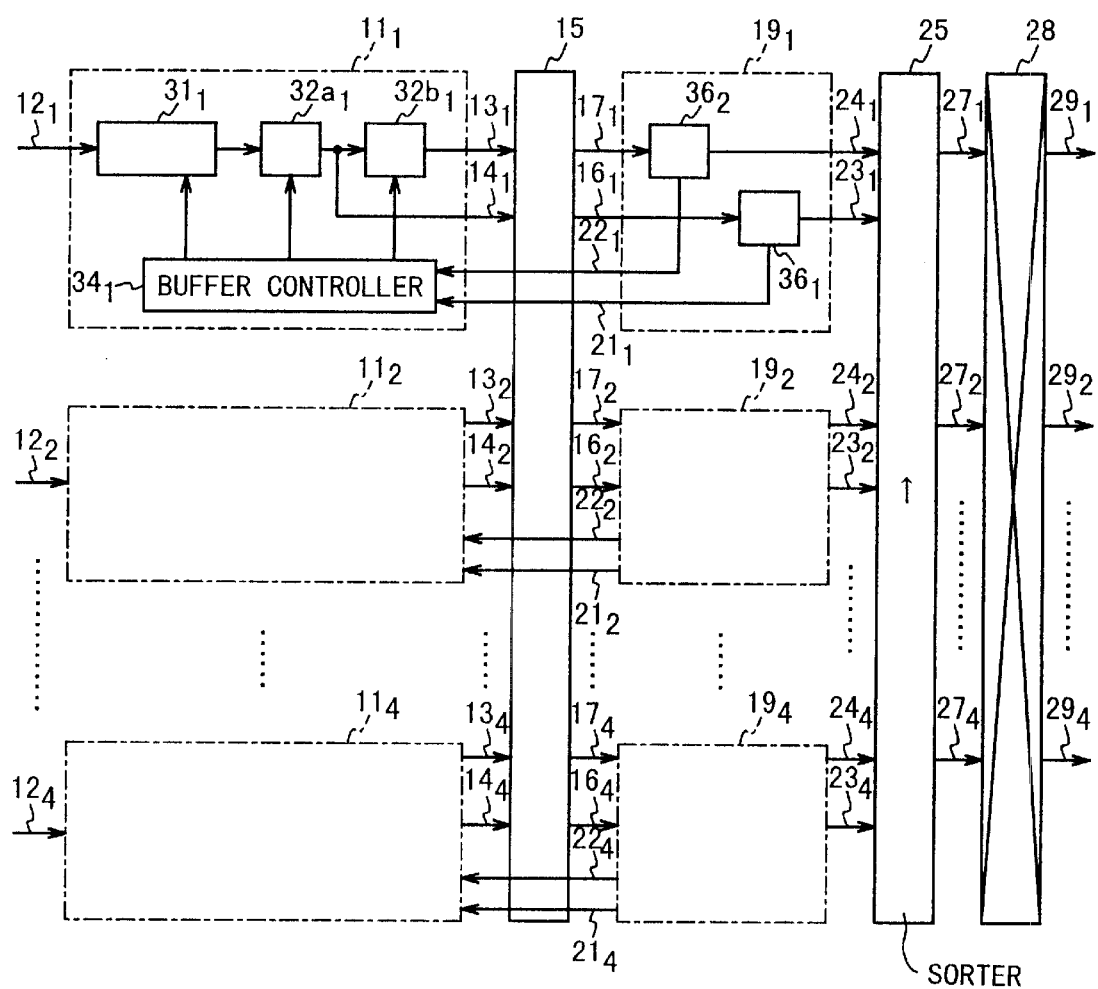
FIG. 4 is a block diagram showing a configuration of an ATM switch according to an embodiment of the present invention.
Figure 5:
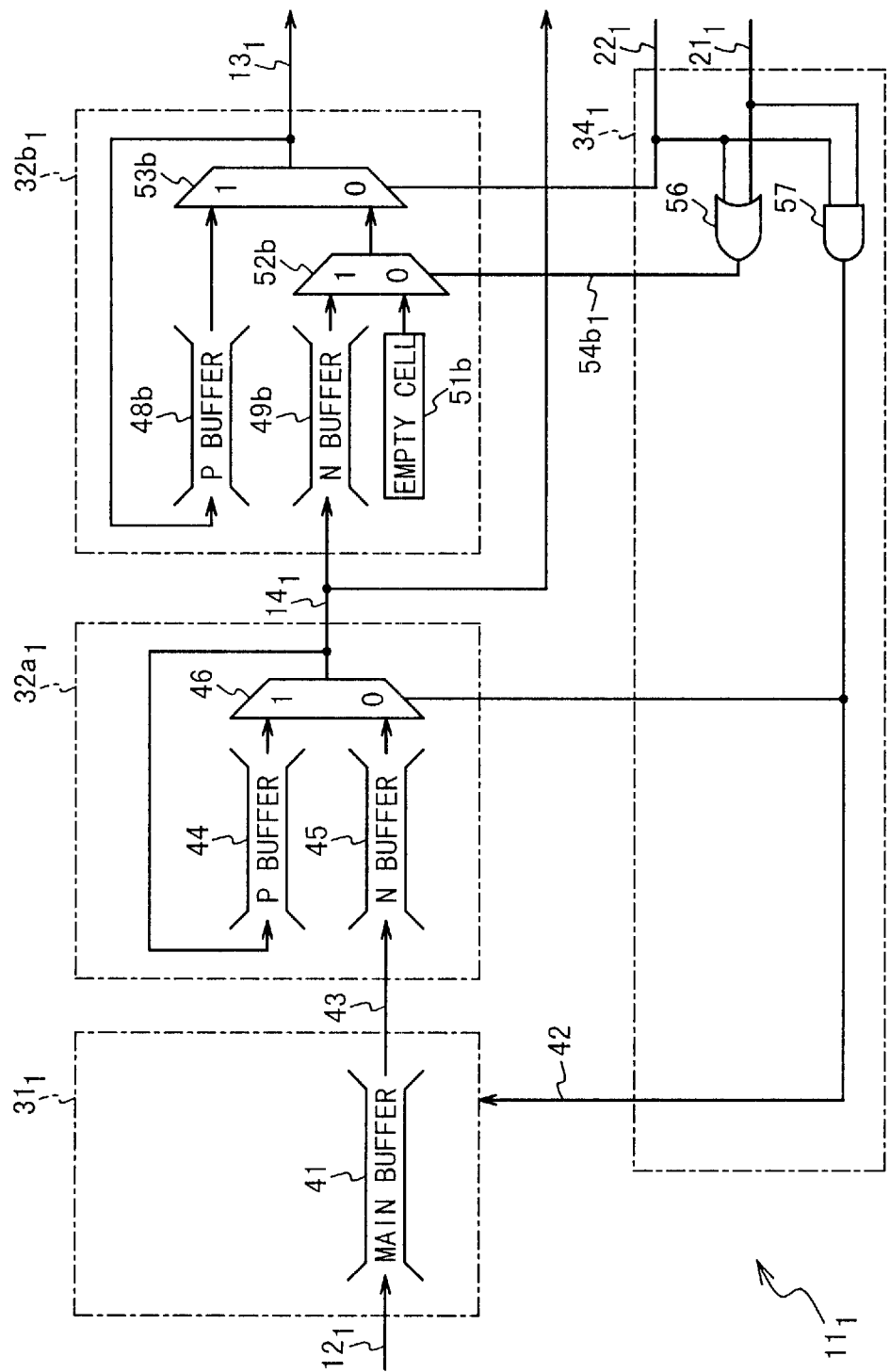
FIG. 5 is a block diagram showing a concrete configuration of a first input buffer shown in FIG. 4.
Figure 6:
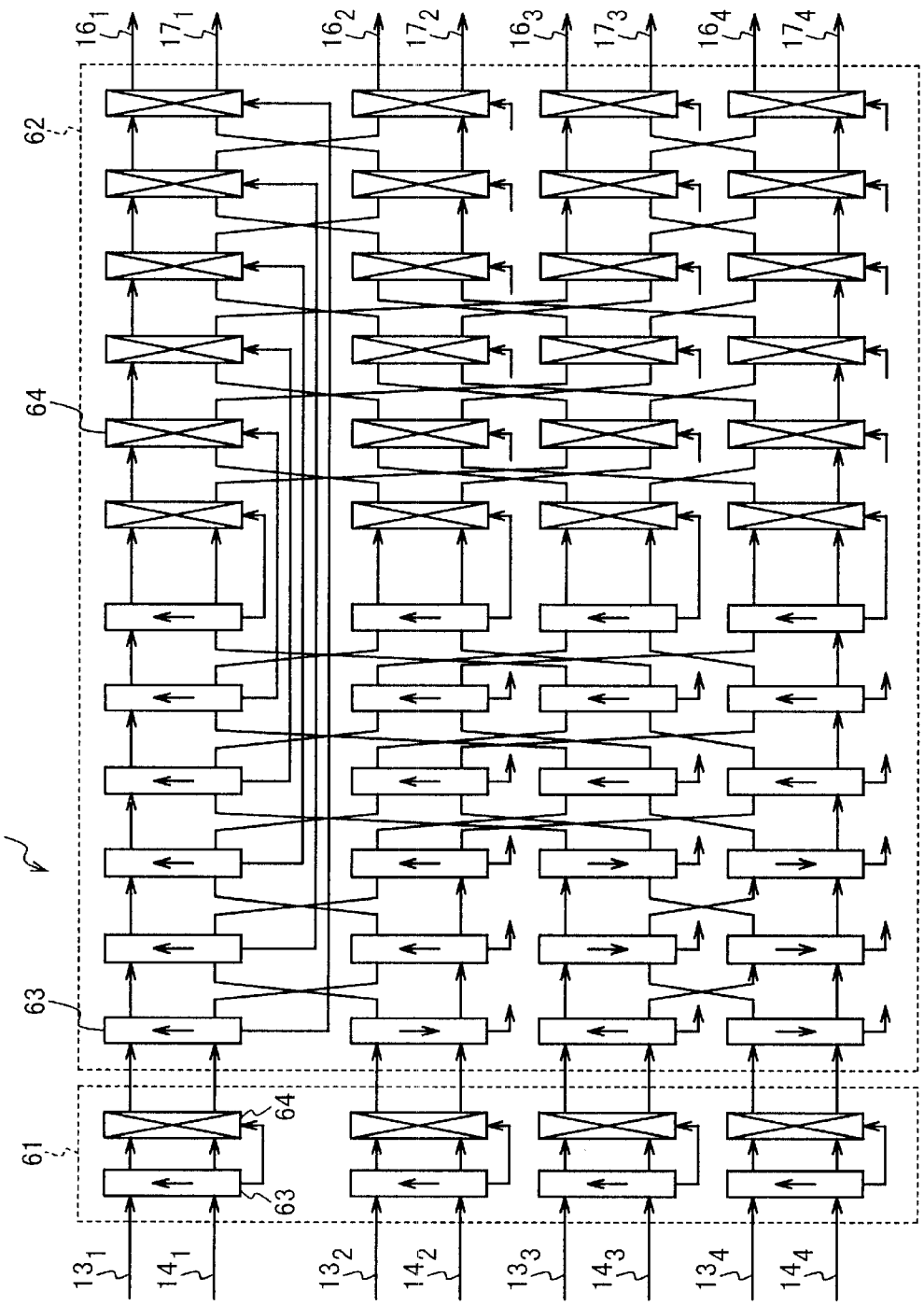
FIG. 6 is a block diagram showing a concrete configuration of a collision judging section shown in FIG. 4.

FIG. 6 is a block diagram showing the concrete configuration of the collision judging section 15 shown in FIG. 4. The collision judging section 15 is composed of a circuit 61 for detecting a collision in a port and a circuit 62 for detecting a collision between cells having the same destination. The circuit 62 is arranged at a next stage of the circuit 61. The circuit 61 for detecting a collision in a port detects a presence or absence of a collision in the same buffer and recovers the input port. The cells $13_1$ to $13_4$ and cells $14_1$ to $14_4$ outputted from the first to fourth input buffers $11_1$ to $11_4$ shown in FIG. 4 are inputted to this circuit 61 for detecting a collision in a port. The circuit 62 for detecting a collision between cells having the same destination detects a presence or absence of a collision between all the input buffers, and recovers the input port. Then, the cells $16_1$ to $16_4$ and cells $17_1$ to $17_4$ outputted from the circuit 15 for detecting a collision between cells having the same destination are sent to the first to fourth cell converters $19_1$ to $19_4$, as mentioned above.

This collision judging section 15 employs a batcher type detection circuit. The collision judging section 15 is constituted by a combination of a unit sorting circuit 63 having two inputs and two outputs and a unit switching circuit 64 having two inputs and two outputs. The operations of the unit sorting circuit 63 and the unit switching circuit 64 will be described later.

Figure 7:
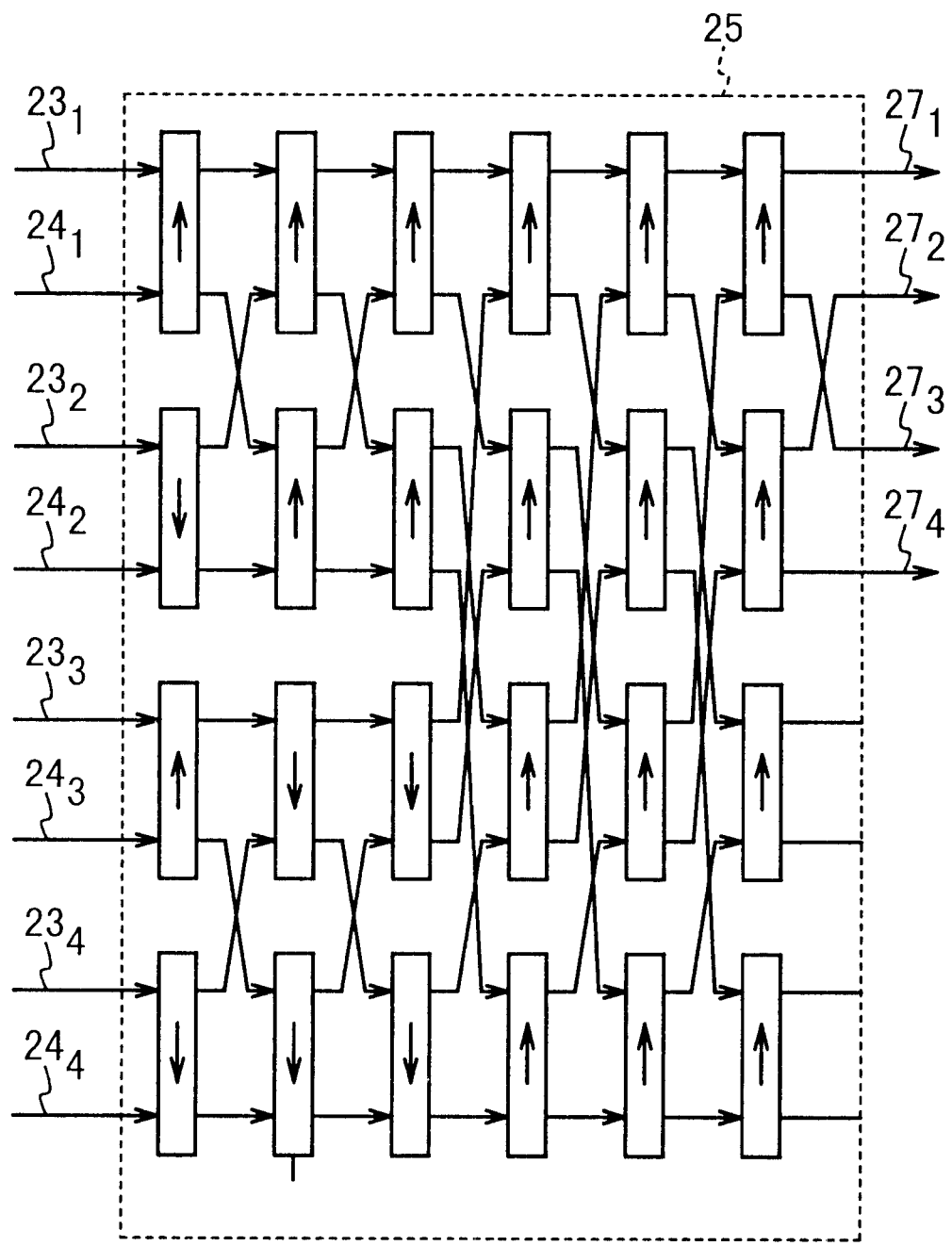
FIG. 7 is a block diagram showing a concrete configuration of a sorter shown in FIG. 4.

FIG. 7 is a block diagram showing a concrete configuration of the sorter 25. The sorter 25 employs an existing batcher type sorter circuit. This sorter 25 is different from a typical batcher type sorter circuit in such a fact that the sorter 25 is constituted by a non-symmetric type sorter having 8 inputs which receives 8 cells $23_1$ to $23_4$ and $24_1$ to $24_4$ and 4 outputs which outputs 4 cells $27_1$ to $27_4$. The reason why the non-symmetric type is employed is that the maximum number of effective cells must be equal to or less than the number of output ports, as mentioned above.

Figure 8:
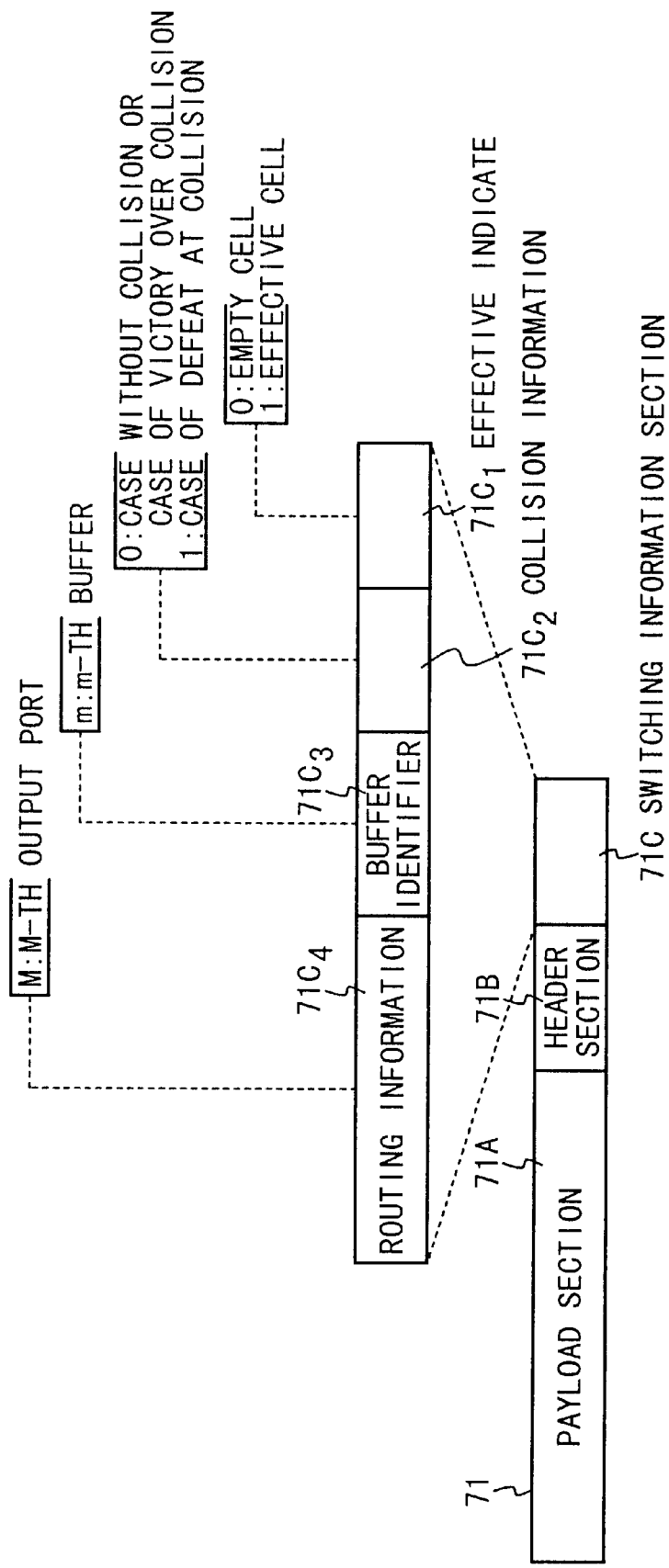
FIG. 8 is an explanatory diagram showing a format of a cell treated in an ATM switch according to an embodiment of the present invention.

FIG. 8 shows a format of the cell treated in the ATM switch according to this embodiment. This cell is constituted by adding a switching information section 71C to a standard ATM cell 71 composed of a payload section 71A and a header section 71B. The switching information section 71C includes an effective indicate section $71C_1$, a collision information section $71C_2$, a buffer identifier $71C_3$ and a routing information section $71C_4$, in order starting from the head.

The effective indicate section $71C_1$ is set to "1" in a case of an effective cell and is set to "0" in a case of an ineffective cell, namely, an empty cell. The collision information section $71C_2$ is set to "0" if there is no collision at the output port or if the cell gets the victory over the collision. It is set to "1" if the cell is defeated at the collision.

An identifier representing whether a transfer source of the cell is the first sub-buffer section $32a_1$ or the second sub-buffer section $32b_1$ is set in the buffer identifier $71C_3$. This identifier is common to all of the first to fourth input buffers $11_1$ to $11_4$. An identifier of a cell outputted from the first sub-buffer section $32a_1$ is set to "1". An identifier of a cell outputted from the second sub-buffer section $32b_1$ is set to "2". Typically, an identifier of a cell outputted from an m-th sub-buffer is set to "m".

Information to specify the output port is set in the routing information section $71C_4$. The routing information of the cells to be outputted from a first output port $29_1$, a second output port $29_2$, a third output port $29_3$ and a fourth output port $29_4$ are set to "0", "1", "2" and "3", respectively. Typically, a routing information of a cell to be outputted from an m-th output port $29_M$ is set to "M−1".

Now, the operation of the input buffer will be described in detail. The respective operations of the first sub-buffer section $32a_1$ and the second sub-buffer section $32b_1$ are controlled by the buffer controller $34_1$ operated in accordance with the collision information $21_1$, $22_1$ fed back from the first conversion circuit $36_1$ and the second conversion circuit $36_2$ in the first cell converter $19_1$.

FIG. 9 is a state transition diagram showing the transition between four states defined by an allowance or rejection of writing data to the N buffer 45 in the first sub-buffer section $32a_1$ and the N buffer 49b in the second sub-buffer section $32b_1$, and the types of inner buffers to be read out from the first sub-buffer section $32a_1$ and the second sub-buffer section $32b_1$ at the next cell transfer timing. Here, the inner buffers imply the N buffer, the P buffer and the empty cell. It should be note that the cells read out from the main buffer section $31_1$ and the first sub-buffer section $32a_1$ are written to the N buffers 45 and N buffer 49b, respectively.

At first, "Initial State" shows a state at a time of starting the operation of the ATM switch or a state when there is no collision between a plurality of cells. If the cell transfer timing arrives in this state, the first sub-buffer section $32a_1$ outputs the cell stored in the N buffer 45 (the effective cell), and the second sub-buffer section $32b_1$ outputs the empty cell. At the same time, an output of the main buffer section $31_1$ is written into the N buffer 45 of the fist sub-buffer section $32a_1$, and an output of the first sub-buffer section $32a_1$ is also written into the N buffer 49b of the second sub-buffer section $32b_1$.

"First State" shows a state when the cell outputted from the first sub-buffer section $32a_1$ is defeated at the collision and also the effective cell is not outputted from the second sub-buffer section $32b_1$, or when there is no collision between the cell and the other cells, or when the cell gets the victory over the collision with the other cells. It should be note that even when the cell outputted from the first sub-buffer section $32a_1$ is defeated at the collision, the cell is stored in the N buffer 49b of the second sub-buffer section $32b_1$, also, a new cell 43 from the main buffer section $31_1$ is stored in the N buffer 45 of the first sub-buffer section $32a_1$. Thus, when the cell transfer timing arrives at this state, the first sub-buffer section $32a_1$ outputs the cell stored in the N buffer 45, and the second sub-buffer section $32b_1$ outputs the cell stored in the N buffer 49b. At the same time, the output of the main buffer section $31_1$ is written into the N buffer 45 of the fist sub-buffer section $32a_1$, and the output of the first sub-buffer section $32a_1$ is also written into the N buffer 49b of the second sub-buffer section $32b_1$.

"Second State" shows a state when the cell outputted from the second sub-buffer section $32b_1$ is defeated at the collision and also the effective cell is not outputted from the first sub-buffer section $32a_1$, or when there is no collision between the cell and the other cells, or when the cell gets the victory over the collision with the other cells. It should be note that even when the cell outputted from the second sub-buffer section $32b_1$ is defeated at the collision, the cell is stored in the P buffer 48b of the second sub-buffer section $32b_1$, also, a new cell 43 from the main buffer section $31_1$ is stored in the N buffer 45 of the first sub-buffer section $32a_1$. Thus, when the cell transfer timing arrives at this state, the first sub-buffer section $32a_1$ outputs the cell stored in the N buffer 45, and the second sub-buffer section $32b_1$ outputs the cell stored in the P buffer 48b. At the same time, the output of the main buffer section $31_1$ is written into the N buffer 45 of the fist sub-buffer section $32a_1$, and the output of the first sub-buffer section $32a_1$ is also written into the N buffer 49b of the second sub-buffer section $32b_1$.

"Third State" shows a state when the cell outputted from the first sub-buffer section $32a_1$ and the cell outputted from the second sub-buffer section $32b_1$ are both defeated at the collision. In this case, it should be note that even when the cell outputted from the first sub-buffer section $32a_1$ is defeated at the collision, it is stored in the P buffer 44 of the first sub-buffer section $32a_1$. Also, even when the cell outputted from the second sub-buffer section $32b_1$ is defeated at the collision, it is stored in then P buffer 48b of the second sub-buffer section $32b_1$ Thus, when the cell transfer timing arrives at this state, the first sub-buffer section $32a_1$ outputs the cell stored in the P buffer 44, and the second sub-buffer section $32b_1$ outputs the cell stored in the P buffer 48b. In this case, since the cell 43 outputted from the main buffer section $31_1$ is already stored in the N buffer 45 of the first sub-buffer section $32a_1$, the operation of writing the data into the N buffer 45 of the first sub-buffer section $32a_1$ is transiently stopped. The output of the first sub-buffer section $32a_1$ is also written into the N buffer 49b of the second sub-buffer section $32b_1$.

Here, when considering the state transition diagram shown in FIG. 9, it is understood that a combination of the outputs of the first conversion circuit $36_1$ and the second conversion circuit $36_2$ which are the transition events between the respective states are all in coincidence with the respective states shown in FIG. 9. That is, when the combination of the respective outputs of the first conversion circuit $36_1$ and the second conversion circuit $36_2$ is represented by ("First Conversion Circuit" and "Second Conversion Circuit"), (0,0) corresponds to "Initial State", (1,0) corresponds to "Second State" and (1,1) corresponds to "Third State", respectively. This fact implies that all the states can be represented by using a truth table without using the state transition diagram as shown in FIG. 9, in order to explain the operations of the first sub-buffer section $32a_1$ and the second sub-buffer section $32b_1$ in the first input buffer $11_1$.

FIG. 10 is the truth table representing the state transition diagram shown in FIG. 9. In FIG. 10, the first conversion circuit $36_1$ is abbreviated to $G_1$, the second conversion circuit $36_2$ is abbreviated to $G_2$, the main buffer 41 is abbreviated to $BF_0$, the first sub-buffer section $32a_1$ is abbreviated to $BF_1$, and the second sub-buffer section $32b_1$ is abbreviated to $BF_2$. Also, the P buffer is merely abbreviated to "P", and the N buffer is merely abbreviated to "N". The meanings of "0" and "1" in the first conversion circuit G1 and the second conversion circuit G2 are as follows. That is, "0" indicates a state that there is no collision between all the cells inputted to the collision judging section 15 or a state that the cell gets the victory over a collision with the other cells when there is the collision. "1" indicates a state that the cell is defeated at a collision when there is the collision between all the cells inputted to the collision judging section 15. It should be noted that the contents of the main buffer 41, the first sub-buffer section $32a_1$ and the second sub-buffer section $32b_1$ are all cleared in the initial state. If it is possible to obtain the truth table as shown in FIG. 10, it is easy to introduce buffer control logic based on that truth table. The buffer controller $34_1$ having the configuration shown in FIG. 5 can be obtained by realizing this truth table with actual logical elements.

Figure 11A:
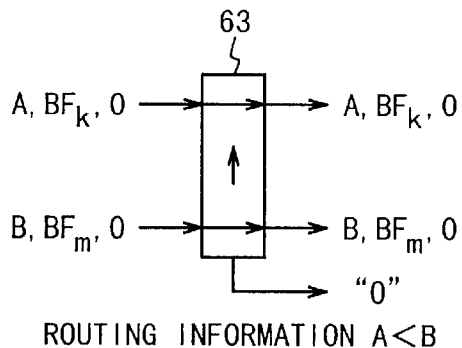
FIGS. 11A to 11I are explanatory diagrams showing an operation of a unit sorting circuit for constituting a batcher type detection circuit used in the ATM switch according to the embodiment of the present invention.
Figure 11B:
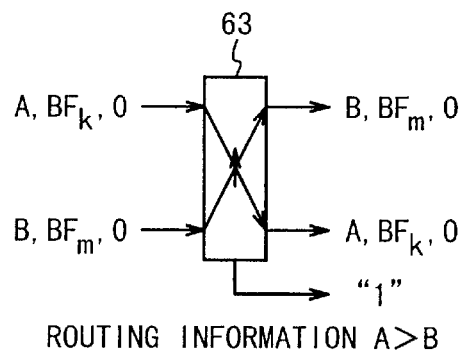

Next, operations of the unit sorting circuit 63 and the unit switching circuit 64 will be described. FIGS. 11A to 11B show the operations of the unit sorting circuit 63. Here, symbols A and B indicate routing information, and symbols $BF_k$ and $BF_m$ indicate buffer identifiers. FIGS. 11A and 11B show the operations when the effective indicate section $71C_1$ (refer to FIG. 8) of the both cells inputted to the unit sorting circuit 63 represent the effective cell and the collision information section $71C_2$ represent that the cells are not defeated at the collision, and the routing information $71C_4$ of the both cells are not equal to each other. In FIG. 11A, a result signal "0" is outputted from the unit sorting circuit 63, and a result signal "1" is outputted in FIG. 11B.

Figure 11C:
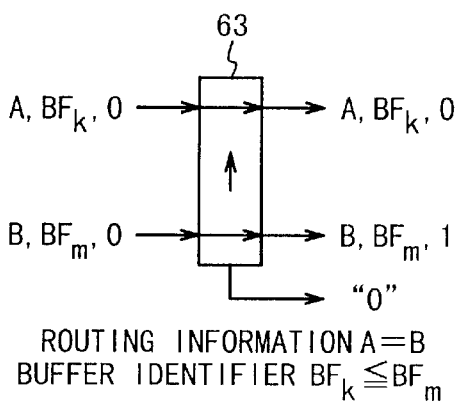
Figure 11D:
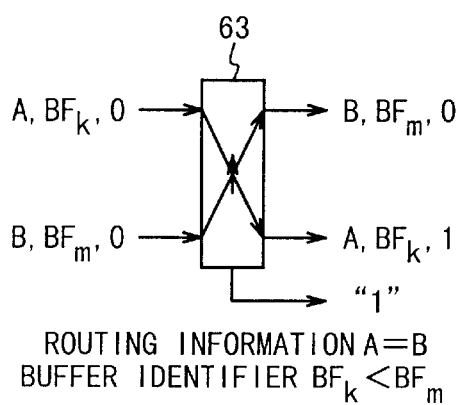

FIGS. 11C and 11D show the operations when the routing information $71C_4$ of the both cells are equal to each other. In this case, the victory or defeat is determined by a relation between a sorting direction and an input, and a magnitude of a value of the buffer identifier $71C_3$. This is because a cell having a large value of the buffer identifier, namely, a temporally older cell is preferentially outputted.

Figure 11E:
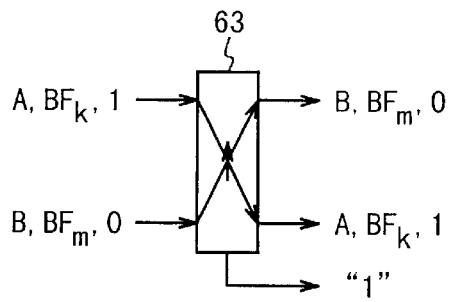
Figure 11F:
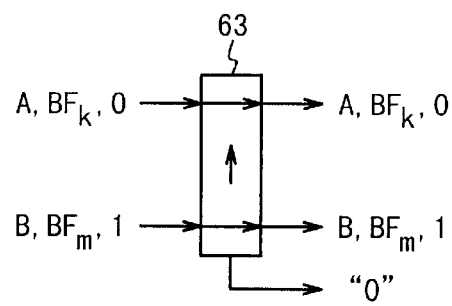

FIGS. 11E and 11F show the operations when the routing information $71C_4$ of the both cells are equal to each other and further the cell is already once defeated. In the case of the cell which is already once defeated in this way, the relation between the sorting direction and the input, and the magnitude of a value of the buffer identifier $71C_3$ are not considered. Thus, it is always judged as the defeat.

Figure 11G:
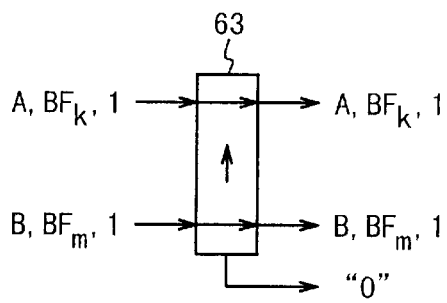
Figure 11H:
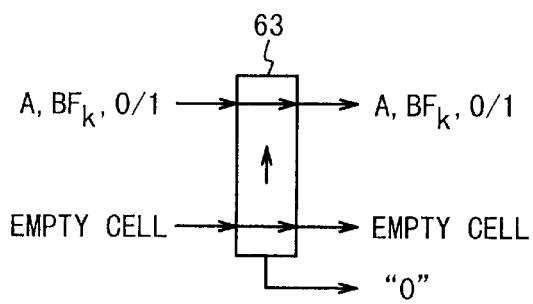
Figure 11I:
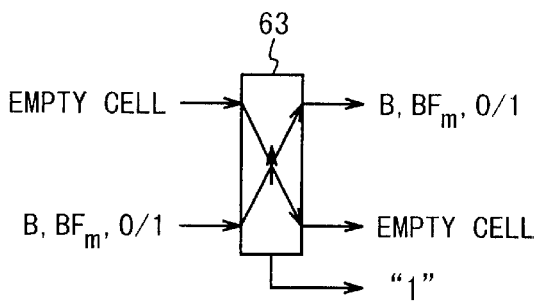

FIG. 11G shows the operation between the defeated cells, and it is not targeted by the judgment. FIGS. 11H and 11I show the case when the empty cell is inputted. The empty cell is always ignored as shown in these drawings.

Figure 12A:
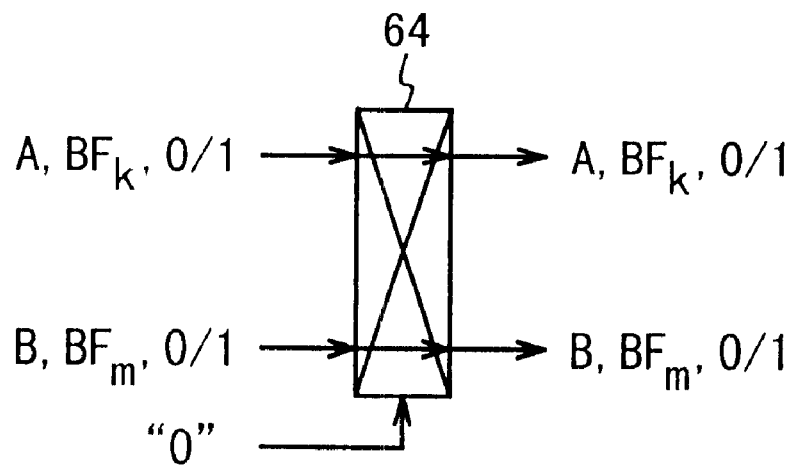
FIGS. 12A and 12B are explanatory diagrams showing an operation of a unit switch circuit for constituting the batcher type detection circuit used in the ATM switch according to the embodiment of the present invention.
Figure 12B:
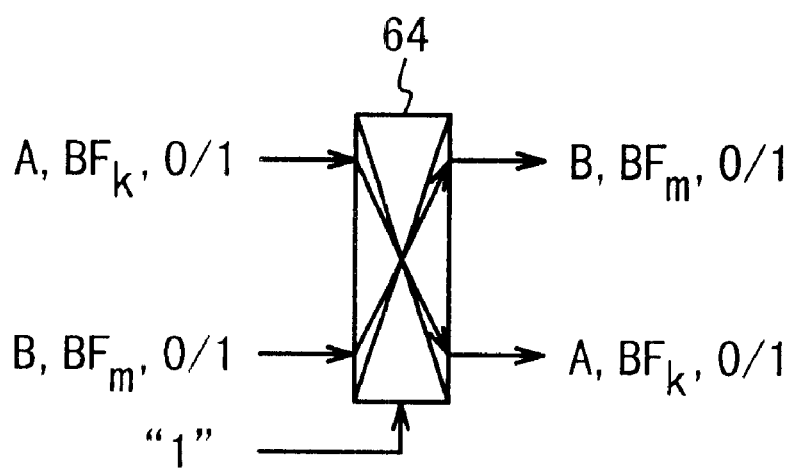

FIGS. 12A and 12B show the operations of the unit switching circuit 64. Here, symbols A and B show routing information, and symbols $BF_K$ and $BF_M$ show buffer identifiers. FIG. 12A shows the operation of the unit switching circuit 64 if an input state signal is "0". In this case, the input cells are outputted just as it without switching. FIG. 12B shows the operation of the unit switching circuit 64 if the input state signal is "1". In this case, the input cells are switched and outputted. Incidentally, the basic operations in these circuits are also disclosed in Japanese Laid Open Patent Application (JP-A-Heisei 8-172436).

Figure 13:
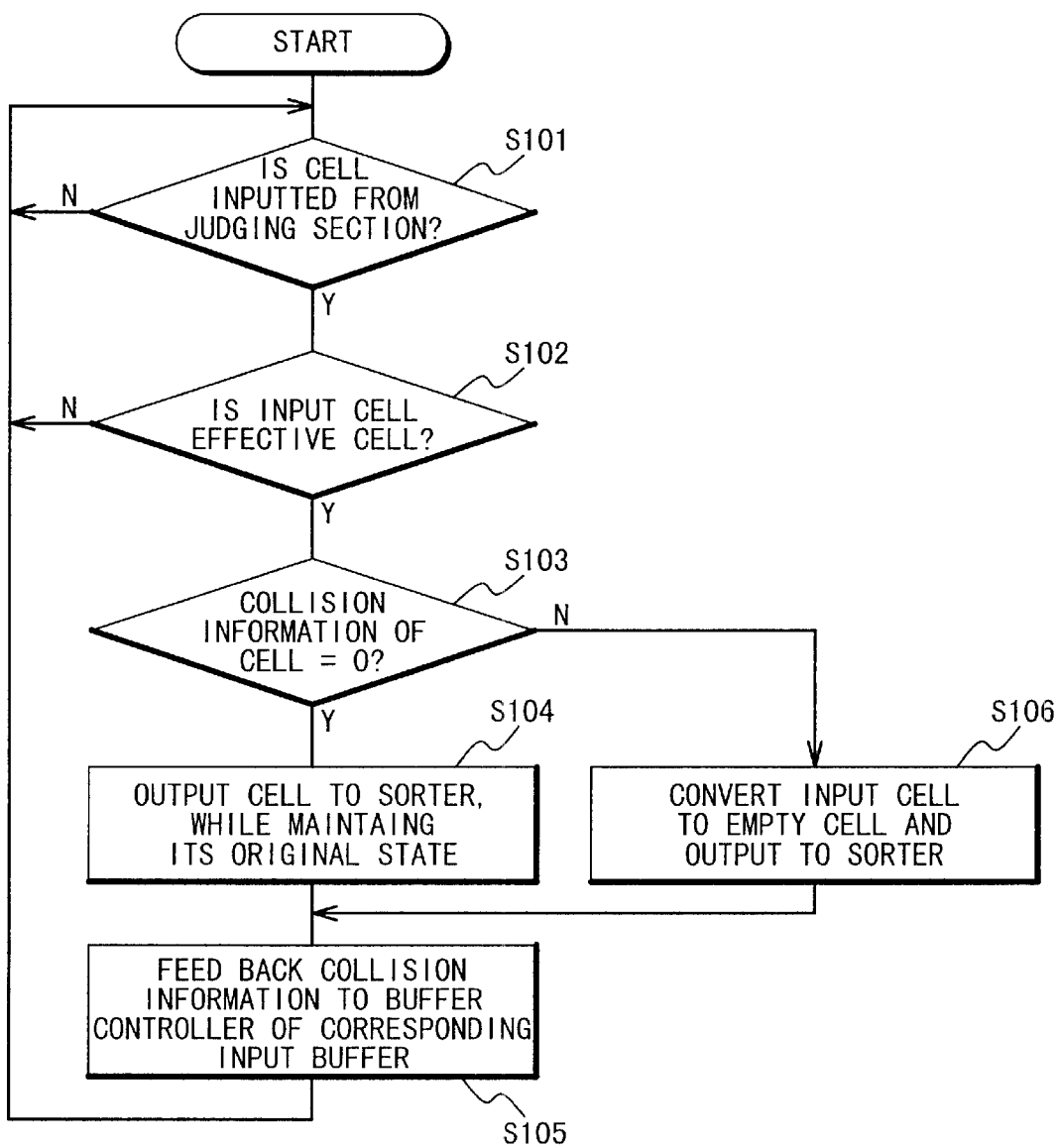
FIG. 13 is a flowchart showing an operation of a first conversion circuit in first to fourth cell converters shown in FIG. 4.
Figure 14:
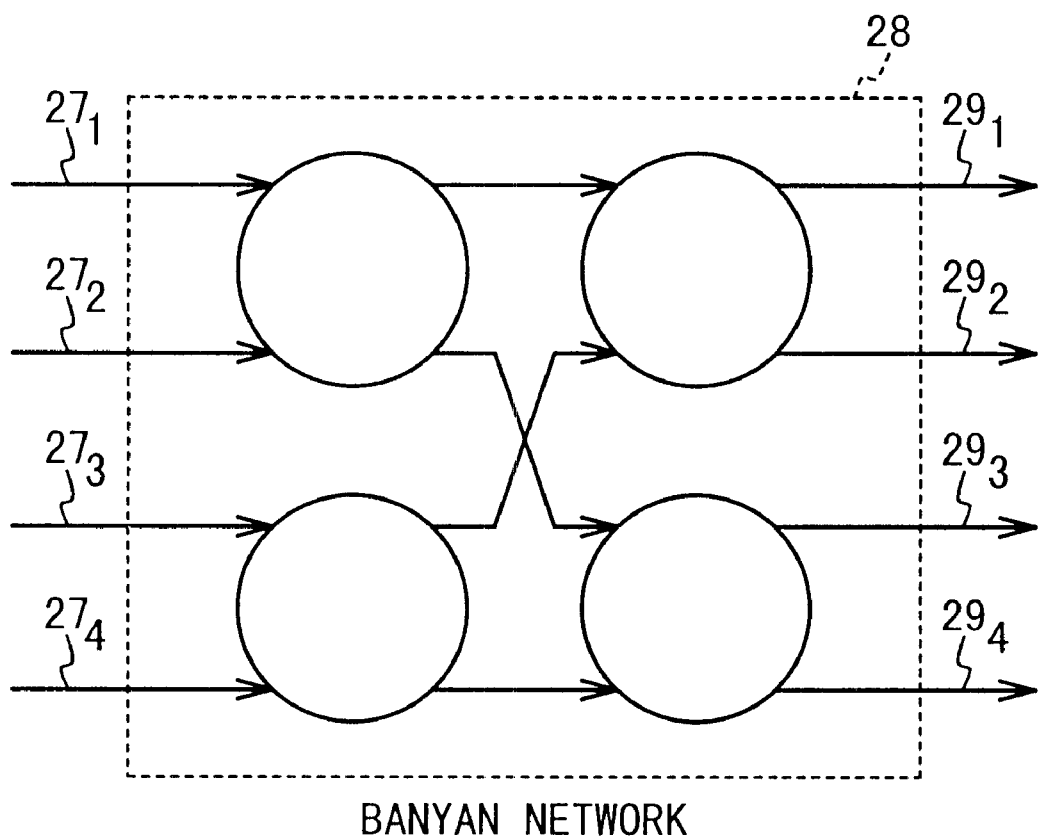
FIG. 14 is a block diagram showing a self-routing section constituted by a Banyan network according to a first variation of the embodiment of the present invention.

Now, the operations of the first to fourth cell converters $19_1$ to $19_4$ will be described. FIG. 13 shows the operation of the first conversion circuit $36_1$ in the first cell converter $19_1$. It should be noted that the operation of the second conversion circuit $36_2$ is also similar to that of the first conversion circuit $36_1$. Each of the first conversion circuit $36_1$ and the second conversion circuit $36_2$ is composed of a receiver a judgment circuit and a cell transfer circuit, although these components are not shown. The receiver receives the cell from the collision judging section 15. The judgment circuit detects whether or not there is the defeat at the collision. When the cell is judged to be defeated, the cell transfer circuit generates an empty cell corresponding to the defeated cell and sends it to a sorter at a next stage. FIG. 14 is a flowchart showing the operations of these components.

At a step S101 of FIG. 13, it is firstly monitored whether or not a cell is inputted from the collision judging section 15. If the cell is inputted (Y), it is checked by referring to the effective indicate section $71C_1$ of the switching information section 71C whether or not the input cell is the effective cell or the empty cell (Step S102).

When it is so judged that the input cell is the effective cell (Y), it is checked by referring to the collision information section $71C_2$ of the switching information section 71C whether or not the collision information section $71C_2$ is "0" (Step S103). If the collision information section $71C_2$ is "0", this is the cell if there is no collision, or the victory cell even if there is the collision. So, if the collision information section $71C_2$ is "0" (Y), the input cell is outputted to the sorter 25 while maintaining its original state (Step S104). Then, the operational flow proceeds to a step S105. On the contrary, if the collision information section $71C_2$ is "1", this is the cell defeated at the collision (Step S103: N). Thus, the input cell is converted into the empty cell and outputted to the sorter 25 (Step S106). Then, the operational flow proceeds to the step S105. At the step S105, the collision information section $71C_2$ of the cell referred at the step S103 is returned to the buffer controller $34_1$ of the first input buffer $11_1$ as the collision information $22_1$. Accordingly, the situation of the collision is reported. After that, the operational flow again returns back to the step S110, and it is monitored whether or not the cell is inputted from the collision judging section 15.

FIG. 14 shows a self-routing section constituted by a Banyan network according to a first variation in this embodiment. This self-routing section has the configuration having four inputs and four outputs (4×4), similarly to that of the above-mentioned embodiment.

Figure 15:
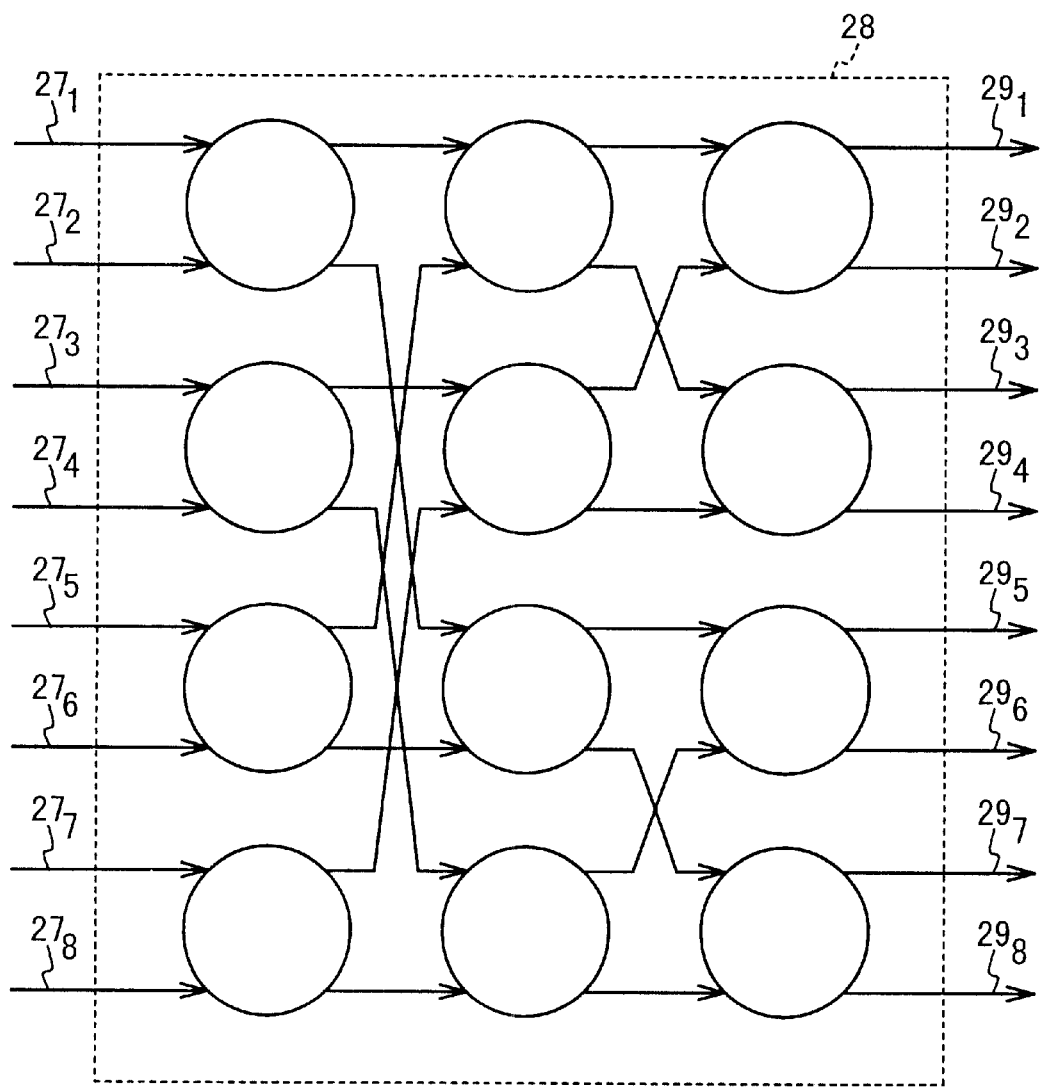
FIG. 15 is a block diagram showing a self-routing section constituted by an 8×8 Banyan network according to a second variation of the embodiment of the present invention.

FIG. 15 shows a self-routing section constituted by an 8×8 Banyan network according to a second variation in this embodiment. It should be noted that the present invention can be applied to an 8×8 ATM switch or an ATM switch having another number of inputs and outputs.

Figure 16:
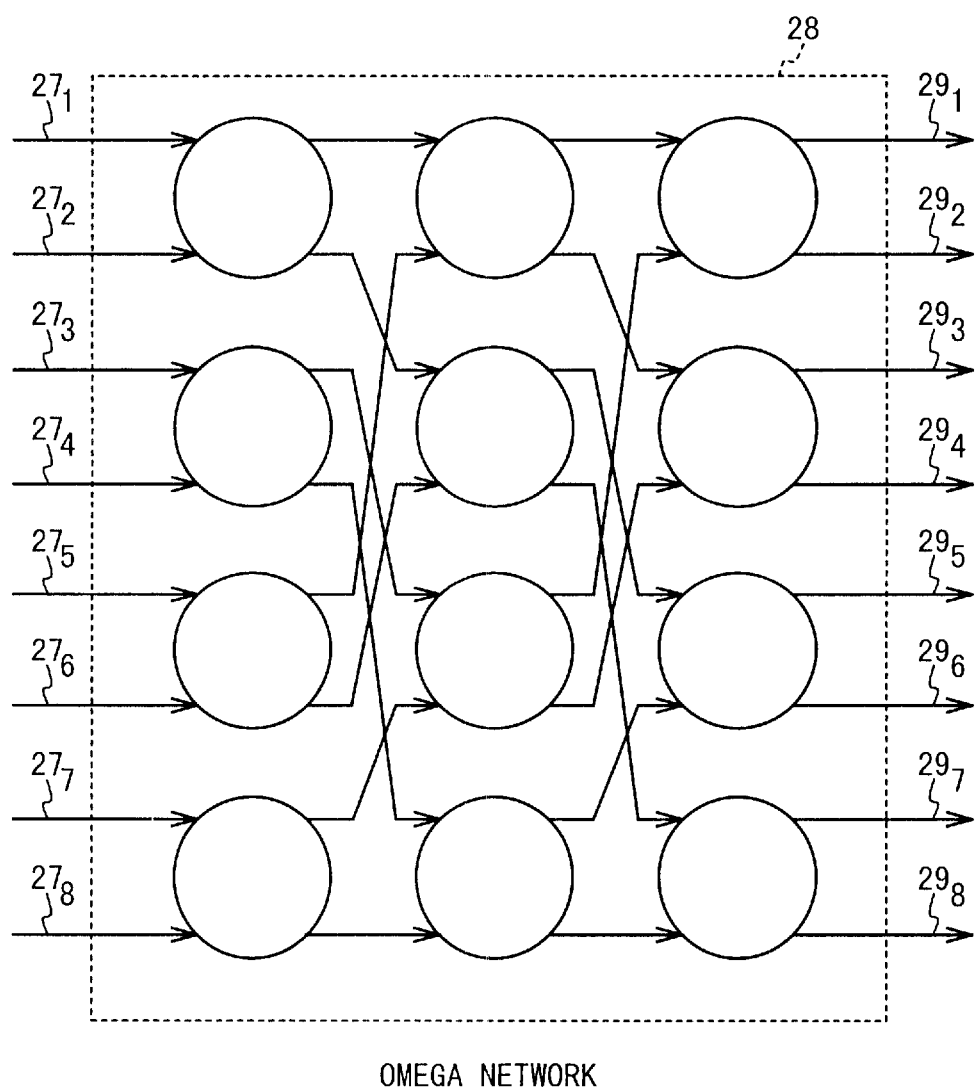
FIG. 16 is a block diagram showing a self-routing section constituted by an 8×8 Omega network according to a third variation of the embodiment of the present invention.

FIG. 16 shows a self-routing section constituted by an 8×8 Omega network according to a third variation in this embodiment. In these first to third variations, the same symbols are given to the portions equivalent to those of FIG. 4. Thus, the detailed explanations thereof are omitted.

Figure 17:
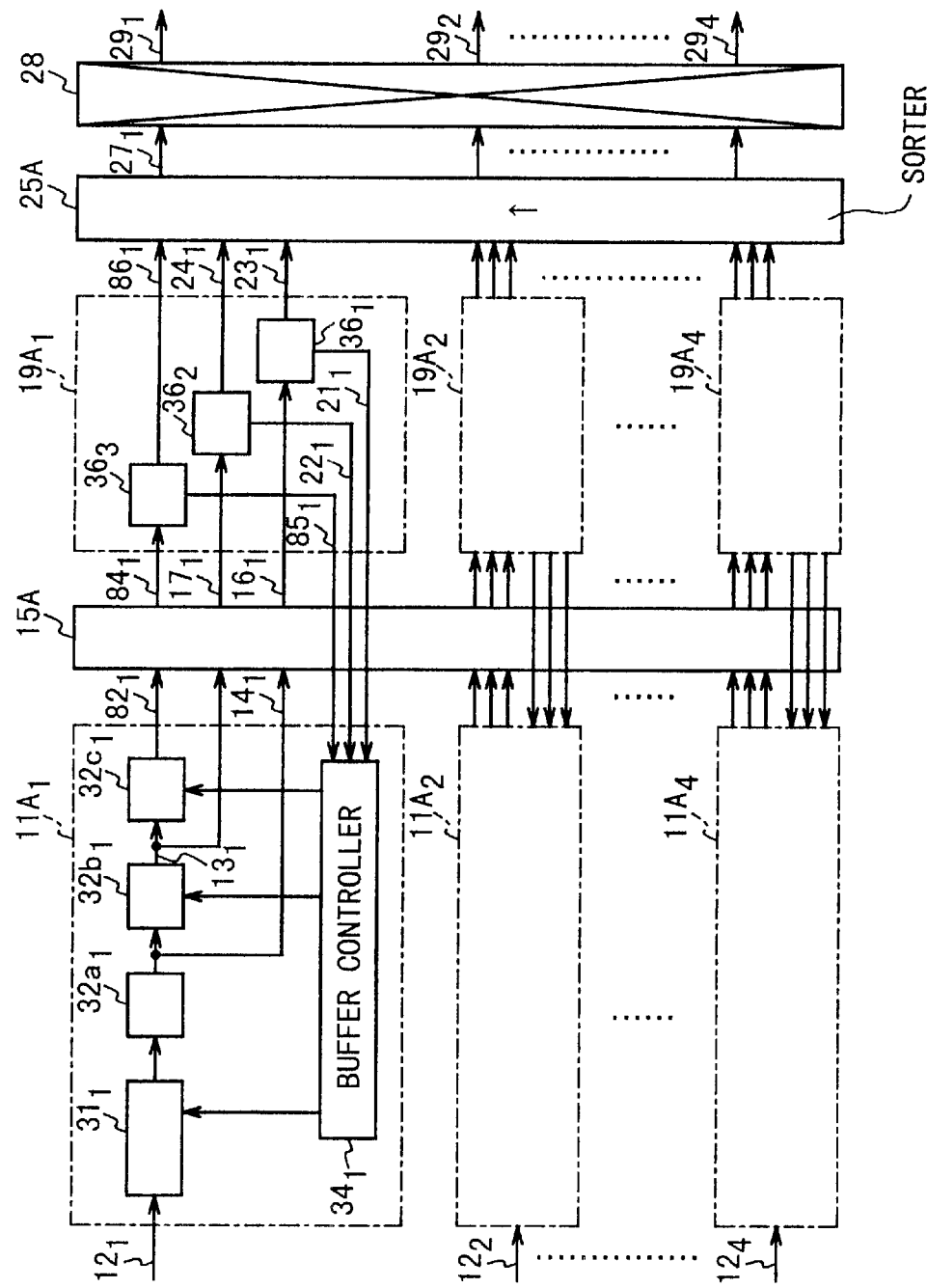
FIG. 17 is a block diagram showing a configuration of an ATM switch according to a fourth variation of the embodiment of the present invention.

FIG. 17 is a block diagram showing a configuration of an ATM switch of a second embodiment of the present invention. In this FIG. 17, the same symbols are given to the portions equivalent to those of FIG. 4, and the explanations thereof are properly omitted. In this second embodiment, a depth of shuffle of the ATM switch is set to "3". Accordingly, a shuffle efficiency is improved over that of the ATM switch in which the depth of shuffle is "2" as shown in FIG. 4.

A first input buffer $11A_1$ of this ATM switch is constituted by adding a third sub-buffer section $32c_1$ to a latter stage of the first sub-buffer section $32a_1$ and the second sub-buffer section $32b_1$ shown in FIG. 4. A buffer controller $34A_1$ controls the main buffer section $31_1$, the first sub-buffer section $32a_1$, the second sub-buffer section $32b_1$ and the third sub-buffer section $32c_1$. The cell $13_1$ outputted from the second sub-buffer section $32b_1$ is sent to the third sub-buffer section $32c_1$ and a collision judging section 15A. Also, a cell $82_1$ outputted from the third sub-buffer section $32c_1$ is sent to the collision judging section 15A.

A first cell converter $19A_1$ is constituted by adding a third conversion circuit $36_3$ to the first conversion circuit $36_1$ and the second conversion circuit $36_2$ shown in FIG. 4. The third conversion circuit $36_3$ receives a cell $84_1$ outputted from the collision judging section 15A, and then returns a collision information $85_1$ to the buffer controller $34A_1$ of the first input buffer $11A_1$, and further sends a cell $86_1$ including victory information to a sorter 25A at a next stage. In addition, the configurations and the operations of the second to fourth input buffers $11A_2$ to $11A_4$ are equal to those of the first input buffer $11A_1$. Also, the configurations and the operations of the second to fourth cell converters $19A_2$ to $19A_4$ are equal to those of the first cell converter $19A_1$.

Figure 18:
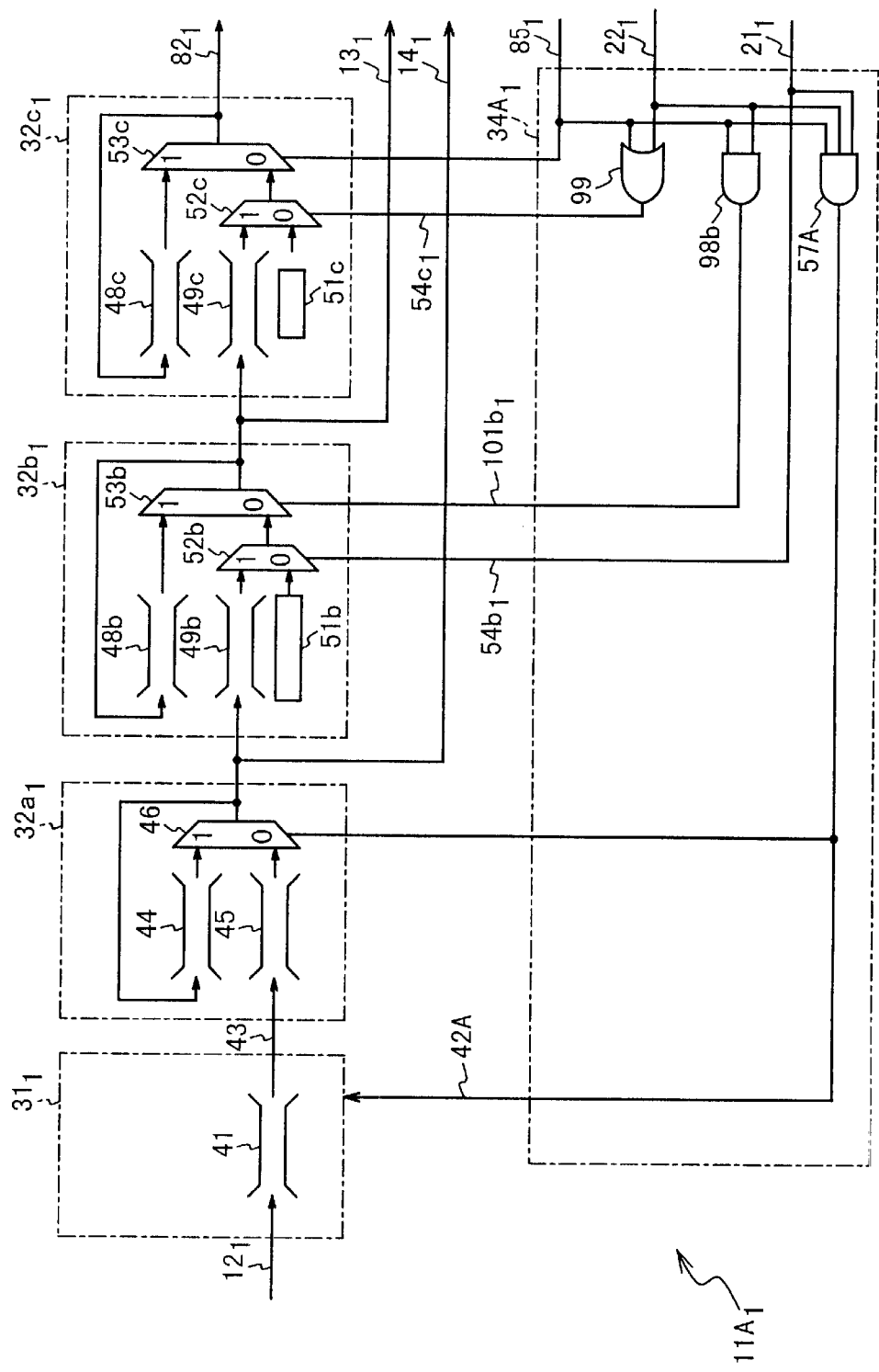
FIG. 18 is a block diagram showing an concrete circuit configuration of a first input buffer in the fourth variation.

FIG. 18 is a block diagram showing the concrete configuration of the first input buffer $11A_1$ of the ATM switch according to this second embodiment. In FIG. 18, the same symbols are given to the portions equivalent to those of the first input buffer $11_1$ (refer to FIG. 5) in the above-mentioned embodiment, and the explanations thereof are omitted.

The third sub-buffer section $32c_1$ in the first input buffer $11A_1$ is composed of a P buffer $48c$, an N buffer $49c$, an empty cell generation circuit $51c$, a first selection circuit $52c$ and a second selection circuit $53c$. Each of the P buffer $48c$ and the N buffer $49c$ has a capacity corresponding to one cell. The N buffer $48c$ stores therein the cell $13_1$ outputted from the second sub-buffer section $32b_1$. The cell stored in this N buffer $48c$ is sent to an input terminal "1" of the first selection circuit $52c$. Also, an output of the empty cell generation circuit $51c$ is sent to an input terminal "0" of the first selection circuit $52c$. The first selection circuit $52c$ selects the cell stored in the N buffer $49c$ or the empty cell from the empty cell generation circuit $51c$, in accordance with a selection control signal $54c_1$ sent from the buffer controller $34A_1$ at the cell transfer timing, and outputs it. The cell outputted from this first selection circuit $52c$ is sent to an input terminal "0" of the second selection circuit $53c$.

The P buffer $48c$ stores therein the cell from the second selection circuit $53c$. The cell stored in this P buffer $48c$ is sent to an input terminal "1" of the second selection circuit $53c$. The second selection circuit $53c$ selects the cell stored in the P buffer $48c$ or the cell from the first selection circuit $52c$, in accordance with the collision information $85_1$ sent from the third conversion circuit $36_3$ of the first cell converter $19_1$, and outputs it as the cell $82_1$. The cell $82_1$ outputted from this second selection circuit $53c$ is sent to the P buffer $48c$ and the collision judging section 15A (refer to FIG. 17).

The buffer controller $34A_1$ is composed of a first AND circuit 57A, a second AND circuit 98b and an OR circuit 99. The first AND circuit 57A performs a logical AND operation between the collision information $21_1$, $22_1$ and $85_3$ to thereby generate a stop signal 42A for transiently stopping a reading out operation of a main buffer. This stop signal 42A for transiently stopping a reading out operation of a main buffer is sent to the main buffer section $31_1$ and the selection circuit 46 of the first sub-buffer section $32a_1$.

Also, the second AND circuit 98b performs the logical AND operation between the collision information $22_1$ and $85_3$ to then send the operation result as a selection control signal $101b_1$ to the second selection circuit $53b$. In addition, the collision information $21_1$ while maintaining its original sate is sent to the first selection circuit $52b$ of the second sub-buffer section $32b_1$. The OR circuit 99 performs the logical OR operation between the collision information $22_1$ and $85_3$ to then send the operation result as a selection control signal $54c_1$ to the first selection circuit $52c$ in the third sub-buffer section $32c_1$. Also, the collision information $85_3$ while maintaining its original state is sent to the second selection circuit $53c$ in the third sub-buffer section $32c_1$.

FIG. 19 shows the configuration of the buffer controller of the ATM switch according to this second embodiment by using a truth table. In FIG. 19, the first conversion circuit $36_1$ is abbreviated to G1, the second conversion circuit $36_2$ is abbreviated to G2, the third conversion circuit $36_3$ is abbreviated to G3, the main buffer 41 is abbreviated to BF0, the first sub-buffer section $32a_1$ is abbreviated to BF1, the second sub-buffer section $32b_1$ is abbreviated to BF2, and the third sub-buffer section $32c_1$ is abbreviated to BF3. Also, the P buffer is merely abbreviated to "P", and the N buffer is merely abbreviated to "N". The meanings of "0" and "1" in the first to third conversion circuits G1 to G3 are as follows. That is, "0" indicates a state that there is no collision between all the cells inputted to the collision judging section 15A or a state that the cell gets the victory over a collision with the other cells when there is the collision. "1" indicates a state that the cell is defeated at a collision when there is the collision between all the cells inputted to the collision judging section 15A. It should be noted that the contents of the main buffer 41 and the first to third sub-buffer sections $32a_1$ to $32c_1$ are all cleared in the initial state.

In the ATM switch according to this second embodiment, the three cells from the respective input buffers are inputted to the collision judging section 15A, as shown in FIG. 17. Thus, the collision judging section 15A receives 12 cells, and outputs 12 cells. Also, each of the first to fourth cell converters $19A_1$ to $19A_4$ requires the three conversion circuits such as the first to third conversion circuits $36_1$ to $36_3$. Moreover, the sorter 25A is configured so as to receive 12 cells and output 4 cells. The configuration and the operation of the self-routing section 28 are similar to those of the above-mentioned embodiment.

A third embodiment of the present invention is an ATM switch in which a depth of shuffle is "4". In this ATM switch, hardware (not shown) for increasing the depth of shuffle is added by using the method similar to that of the second embodiment.

FIG. 20 shows the configuration of a buffer controller of the ATM switch according to this third embodiment by using a truth table. In FIG. 20, a first conversion circuit $36_1$ is abbreviated to G1, a second conversion circuit $36_2$ is abbreviated to G2, a third conversion circuit $36_3$ is abbreviated to G3, a fourth conversion circuit $36_4$ is abbreviated to G4, a main buffer 41 is abbreviated to BF0, a first sub-buffer section $32a_1$ is abbreviated to BF1, a second sub-buffer section $32b_1$ is abbreviated to BF2, a third sub-buffer section $32c_1$ is abbreviated to BF3, and a fourth sub-buffer is abbreviated to BF3. Also, a P buffer is merely abbreviated to "P", and an N buffer is merely abbreviated to "N". The meanings of "0" and "1" in the first to fourth conversion circuits G1 to G4 are as follows. That is, "0" indicates a state that there is no collision between all the cells inputted to a collision judging section or a state that the cell gets the victory over a collision with the other cells when there is the collision. "1" indicates a state that the cell is defeated at a collision when there is the collision between all the cells inputted to the collision judging section. It should be noted that the contents of the main buffer 41 and the first to fourth sub-buffer sections $32a_1$ to $32d_1$ are all cleared in the initial state.

FIG. 21 is a block diagram showing the configuration of the input buffer when the depth of shuffle is generalized as "m". The same symbols are given to the portions equivalent to that of FIG. 18, and the explanations thereof are properly omitted.

The configurations of a k-th sub-buffer section $32k_1$ and an M-th sub-buffer section $32m_1$ in a first input buffer $11M_1$ are equivalent to those of the second sub-buffer section $32b_1$ in the above-mentioned embodiments. A cell $93k_1$ is inputted from a (k−1)-th sub-buffer section at a former stage to an N buffer of the k-th sub-buffer section $32k_1$. Also, the cell outputted from this k-th sub-buffer section $32k_1$ is sent to a collision judging section and a (k+1)-th sub-buffer section at a next stage (both of them are not shown). Similarly, a cell $93m_1$ is inputted from an (m−1)-th sub-buffer at a former stage to an N buffer of the m-th sub-buffer section $32m_1$. Also, a cell $82m_1$ outputted from this m-th sub-buffer section $32m_1$ is sent to a collision judging section (not shown).

A first selection circuit $52k$ and a second selection circuit $53k$ in the k-th sub-buffer section $32k_1$ are controlled in accordance with a collision information $85k_1$ and a selection control signal $54k_1$ outputted from a buffer controller $34M_1$, respectively. Also, a first selection circuit $52m$ and a second selection circuit $53m$ in the m-th sub-buffer section $32m_1$ are controlled in accordance with a collision information $85m_1$ and a selection control signal $54m_1$ outputted from the buffer controller $34M_1$, respectively. Here, the collision information $85k_1$, $85m_1$ are the information outputted from m-th conversion circuits $36k$, $36_M$ (not shown), respectively. A collision information $85_3$ is equal to the collision information $85_3$ shown in FIG. 17, a collision information $85_2$ is equal to the collision information $21_1$ and a collision information $85_1$ is equal to the collision information $22_1$ respectively.

The buffer controller $34M_1$ has (m−1) AND circuits 57A, 98b, ... 98k, ... and 98(m−1) and an OR circuit 99. The first AND circuit 57A performs a logical AND operation between all the collision information $21_1$, $22_1$ and $85_M$ (equivalent to the collision information $85_1$, $85_2$ ... $85_M$, as mentioned above) outputted from the first to m-th conversion circuits $36_1$ to $36_M$ (not shown) corresponding to the shuffle depth "m". A stop signal $42_M$ for transiently stopping a reading out operation of a main buffer which is outputted from the first AND circuit 57A is sent to the main buffer section $31_1$, and further sent to the selection circuit 46 of the first sub-buffer section $32a_1$.

A selection control signal $101k_1$ outputted from the k-th AND circuit $98k$ is inputted to the second selection circuit $53k$ of the k-th sub-buffer section $32k_1$, and a selection control signal $54k_j$ is sent to the first selection circuit $52k$. Here, the k-th AND circuit $98k$ performs the logical AND operation between the collision information $85_M$, $85k_{m-1}$, ... and $85k$. This logical AND operation is performed to detect such a case that the result of the logical product is "1", namely, to detect whether or not the collision occurs in all the sub-buffers on and after the "k-th" stage. Also, the OR circuit 99 performs the logical OR operation between the collision information $85k_{m-1}$ and the collision information $85_M$.

It should be noted that a stop signal $42_A$ for transiently stopping a reading out operation of a main buffer while maintaining its original state is sent to the selection circuit 46 in the first sub-buffer section $32a_1$. Also, the collision information $85k_1$ while maintaining its original state is sent to the first selection circuit $52k$ of the k-th sub-buffer section $32k_1$.

FIG. 22 is a block diagram showing a configuration of a first input buffer of an ATM switch according to a fourth embodiment of the present invention. This first input buffer 11B is composed of a main buffer section $31_1$, a first sub-buffer section $32a_1$, a second sub-buffer section $32b_{1A}$ and a buffer controller $34_{1A}$, similarly to those of the above-mentioned embodiment shown in FIG. 5. In FIG. 22, the same symbols are given to the portions equivalent to those of FIG. 5, and the explanations thereof are properly omitted.

In this fourth embodiment, the configuration of the second sub-buffer section $32b_{1A}$ is made simpler. That is, the empty cell generation circuit $51b$ and the first selection circuit $52b$ for selecting the output thereof and the output of the N buffer $49b$ are removed as compared with the second sub-buffer section $32b_1$ shown in FIG. 5. In the second sub-buffer section $32b_{1A}$ according to this embodiment, the empty cell is generated by clearing the N buffer $49b$, and then the generated empty cell is externally send out. According to this configuration, since the empty cell generation circuit and the first selection circuit are not necessary, the circuit configuration of the second sub-buffer section $32b_{1A}$ becomes simple.

As mentioned above, according to the present invention, the shuffle operation of the cells stored in the input buffers can be carried out by using the FIFO memories for taking out the cell in the input order, the small capacity of buffer memories and the selection circuits. Thus, it is possible to simplify the buffer configuration of the input buffer type ATM switch and further possible to make the speed of the input buffer faster and also make the buffer control easier.

Also, the plurality of cells can be read out from the input buffer at a time. Thus, if the output port becomes empty due to the cancellation of the competition relation in such a condition that the plurality of accumulation cells exist in the input buffer, the plurality of cells can be read out and outputted from the input buffer at a time. As a result, the problems are not brought about, such as the drop of the throughput in the conventional input buffer type ATM switch and the prolongation of the overcrowding state, which enables the high speed process.

Moreover, the empty cell generation circuit is mounted in the sub-buffer circuits on and after the second stage. Thus, the process of sending the empty cell can be made faster.

What is claimed is:

1. An ATM switch comprising:

an input port which sequentially receives ATM cells;

a main buffer section which stores the ATM cells received by said input port and outputs the stored ATM cells in an order of the reception;

a sub-buffer section which stores the ATM cells from said main buffer section and shuffles the ATM cells stored in said sub-buffer and outputs the shuffled ATM cells;

a collision judging section which judges whether or not a collision between the ATM cells outputted from said sub-buffer section occurs and judges whether each of the colliding ATM cells is a victory ATM cell or a defeat ATM cell when the occurrence of the collision is judged, the ATM cells other than said colliding ATM cells being non-collision ATM cells;

a buffer controller which controls said sub-buffer section based on the judging result by said collision judging section such that said victory ATM cell and said non-collision ATM cells are outputted and said defeat ATM cell is stored and held in said sub-buffer section; and a routing section which performs a routing operation to each of said victory ATM cell and said non-collision ATM cells from said collision judging section to output from a predetermined output port.

2. An ATM switch according to claim 1, wherein said sub-buffer section includes:

a first sub-buffer section which stores the ATM cells outputted from said main buffer section; and a second sub-buffer section which stores the ATM cells outputted from said first sub-buffer section, and wherein said collision judging section judges whether or not the collision between one of the ATM cells stored in said first sub-buffer and one of the ATM cells stored in said second sub-buffer occurs, and wherein said buffer controller controls said first sub-buffer section based on the judging result by said collision judging section such that said victory ATM cell and said non-collision ATM cells are outputted from said first sub-buffer section and said defeat ATM cell is held in said first sub-buffer section, and controls said second sub-buffer section based on the judging result by said collision judging section such that said victory ATM cell and said non-collision ATM cells are outputted from said second sub-buffer section and said defeat ATM cell is held in said second sub-buffer section.

3. An ATM switch according to claim 2, wherein said first sub-buffer section includes:

a first buffer which stores each of the ATM cells from said main buffer section;

a second buffer which stores the ATM cell supplied thereto; and a first selector which selects one of the ATM cell stored in said first buffer and the ATM cell stored in second buffer at a cell transfer timing, supplies the selected ATM cell to said second buffer and sends the selected ATM cell to said collision judging section, and wherein said buffer controller controls said first selector at a next cell transfer timing such that the ATM cell stored in said second buffer is selected when said collision judging section judges that the ATM cell sent via said first selector is said defeat ATM cell.

4. An ATM switch according to claim 3, wherein said first buffer and said second buffer have capacities for one ATM cell, respectively.

5. An ATM switch according to claim 2, wherein said second sub-buffer section includes:

a third buffer which stores the ATM cells from said first sub-buffer section;

a fourth buffer which stores the ATM cells supplied thereto; and a second selector which selects one of the ATM cell stored in said third buffer and the ATM cell stored in said fourth buffer at a cell transfer timing, supplies the selected ATM cell to said fourth buffer and sends the selected ATM cell to said collision judging section, and wherein said buffer controller controls said second selector at a next cell transfer timing such that the ATM cell stored in said fourth buffer is selected when said collision judging section judges that the ATM cell sent via said second selector is said defeat ATM cell.

6. An ATM switch according to claim 5, wherein said third buffer and said fourth buffer have capacities for one ATM cell, respectively.

7. An ATM switch according to claim 5, wherein said second sub-buffer section further comprising:

an empty cell generation circuit which generates an empty cell, and wherein said second selector selects one of the empty cell generated by said empty cell generation circuit, the ATM cell stored in said third buffer and the ATM cell stored in said fourth buffer at the cell transfer timing, supplies the selected one to said fourth buffer and sends the selected one to said collision judging section, and wherein said buffer controller controls said second selector at the next cell transfer timing such that the empty cell generated by said empty cell generation circuit is selected when said second sub-buffer has no ATM cell to be outputted, and controls said second selector at the next cell transfer timing such that the ATM cell stored in said fourth buffer is selected when said collision judging section judges that the ATM cell sent from said second selector is said defeat ATM cell.

8. An ATM switch according to claim 2, wherein said second sub-buffer section includes:

a third buffer which stores the ATM cells from said first sub-buffer section;

a fourth buffer which stores the ATM cells supplied thereto; and a second selector which selects one of the ATM cell stored in said third buffer and the ATM cell stored in said fourth buffer at a cell transfer timing, supplies the selected ATM cell to said fourth buffer and sends the selected ATM cell to said collision judging section, and wherein said buffer controller controls said second selector at a next cell transfer timing such that an empty cell generated by clearing said third buffer is selected when said second sub-buffer has no ATM cell to be outputted, and controls said second selector at the next cell transfer timing such that the ATM cell stored in said fourth buffer is selected when said collision judging section judges that the ATM cell sent from said second selector is said defeat ATM cell.

9. An ATM switch according to claim 2, wherein said buffer controller includes:
   a truth table which represents changes of states of said first sub-buffer section and said second sub-buffer section; and
   a section which refers to said truth table based on the judging result by said collision judging section to control said sub-buffer section.

10. An ATM switch according to claim 1, further comprising:
    a sorter which sorts said victory ATM cell and said non-collision ATM cell outputted from said sub-buffer section and controls such that the maximum number of said victory ATM cell and said non-collision ATM cell is equal to or less than the number of the output ports of said routing portion.

11. An ATM switching method comprising:
    (A) storing ATM cells sequentially received by an input port into a main buffer section;
    (B) outputting the ATM cells stored in said main buffer section in an order of the reception;
    (C) storing the ATM cells from said main buffer section into a sub-buffer section;
    (D) shuffling the ATM cells stored in said sub-buffer and outputting the shuffled ATM cells;
    (E) judging whether or not a collision between the ATM outputted from said sub-buffer section occurs, and judging whether each of the colliding ATM cells is a victory ATM cell or a defeat ATM cell when the occurrence of the collision is judged, the ATM cells other than said colliding ATM cells being non-collision ATM cells;
    (F) controlling said sub-buffer section based on the judging result at said step (E) such that said victory ATM cell and said non-collision ATM cells are outputted and said defeat ATM cell is stored and held in said sub-buffer section; and
    (G) performing a routing operation to each of said victory ATM cell and said non-collision ATM cells outputted from said sub-buffer section to send from a predetermined output port.

12. An ATM switching method according to claim 11, wherein said step (C) includes:
    (C1) storing the ATM cells outputted from said main buffer section into a first sub-buffer section; and
    (C2) storing the ATM cells outputted from said first sub-buffer section into a second sub-buffer section, and wherein at said step (E),
        judging whether or not the collision between one of the ATM cells stored in said first sub-buffer and one of the ATM cells stored in said second sub-buffer occurs, and wherein at said step (F),
        controlling said first sub-buffer section based on the judging result at said step (E) such that said victory ATM cell and said non-collision ATM cells are outputted from said first sub-buffer section and said defeat ATM cell is held in said first sub-buffer section, and
        controlling said second sub-buffer section based on the judging result at said step (E) such that said victory ATM cell and said non-collision ATM cells are outputted from said second sub-buffer section and said defeat ATM cell is held in said second sub-buffer section.

13. An ATM switching method according to claim 12, wherein said step (C1) includes:
    storing each of the ATM cells from said main buffer section into a first buffer;
    storing the ATM cells into said second buffer supplied thereto; and
    selecting one of the ATM cell stored in said first buffer and the ATM cell stored in said second buffer at a cell transfer timing, supplying the selected ATM cell to said second buffer and outputting for the judgement, and wherein at said step (F),
    controlling said the first sub-buffer at a next cell transfer timing such that the ATM cell stored in said second buffer is selected when said judging result at said step (E) indicates that the ATM cell sent from said first sub-buffer is said defeat ATM cell.

14. An ATM switching method according to claim 12, wherein said step (C2) includes:
    storing the ATM cells from said first sub-buffer section into a third buffer;
    storing the ATM cells into said fourth buffer supplied thereto; and
    selecting one of the ATM cell stored in said third buffer and one of the ATM cell stored in said fourth buffer at a cell transfer timing, supplying the selected ATM cell to said fourth buffer and outputting for the judgement, and wherein at said step (F),
    controlling said second sub-buffer at a next cell transfer timing such that the ATM cell stored in said fourth buffer is selected when said judging result at said step (E) indicates that the ATM cell sent from said second sub-buffer is said defeat ATM cell.

15. An ATM switching method according to claim 14, wherein said step (C2) section further comprising:
    generating an empty cell; and
    outputting the empty cell when said second sub-buffer has no ATM cell to be outputted.

16. An ATM switching method according to claim 15, wherein at said generating step, the empty cell is generated by clearing the contents of said third buffer.

17. An ATM switching method according to claim 12, wherein at said step (F),
    providing a truth table which represents changes of states of said first sub-buffer section and said second sub-buffer section; and
    controlling said sub-buffer section by referring to said truth table based on the judging result at said step (E).

18. An ATM switching method according to claim 11, further comprising:
    sorting said victory ATM cell and said non-collision ATM cell outputted from said sub-buffer section; and
    controlling such that the maximum number of said victory ATM cell and said non-collision ATM cell is equal to or less than the number of the output ports.

* * * * *